US012657348B2

(12) United States Patent
Sharma et al.

(10) Patent No.: US 12,657,348 B2
(45) Date of Patent: Jun. 16, 2026

(54) APPARATUS AND METHOD TO IMPLEMENT HOMOMORPHIC ENCRYPTION AND COMPUTATION WITH DRAM

(71) Applicant: Intel Corporation, Santa Clara, CA (US)

(72) Inventors: Abhishek Anil Sharma, Portland, OR (US); Wilfred Gomes, Portland, OR (US); Pushkar Ranade, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 17/712,097

(22) Filed: Apr. 2, 2022

(65) Prior Publication Data

US 2023/0315920 A1     Oct. 5, 2023

(51) Int. Cl.
| | |
|---|---|
| *G06F 21/79* | (2013.01) |
| *G06F 7/50* | (2006.01) |
| *G06F 7/523* | (2006.01) |
| *G06F 21/60* | (2013.01) |
| *H03K 19/20* | (2006.01) |

(52) U.S. Cl.
CPC ............... *G06F 21/79* (2013.01); *G06F 7/50* (2013.01); *G06F 7/523* (2013.01); *G06F 21/602* (2013.01); *H03K 19/20* (2013.01)

(58) Field of Classification Search
CPC .......... G06F 21/79; G06F 7/50; G06F 21/602; H03K 19/20
See application file for complete search history.

(56) References Cited

U.S. PATENT DOCUMENTS

| | | | | |
|---|---|---|---|---|
| 11,056,173 B2* | 7/2021 | O | .......................... | G06F 3/0623 |
| 2016/0284709 A1* | 9/2016 | Basker | ................. | H10D 30/024 |
| 2020/0091156 A1 | 3/2020 | Sharma et al. | | |
| 2020/0185371 A1* | 6/2020 | Zhang | ................... | G06F 21/564 |
| 2021/0247978 A1* | 8/2021 | Malladi | ................. | G06F 9/3001 |
| 2021/0351913 A1 | 11/2021 | No et al. | | |
| 2021/0376997 A1 | 12/2021 | Lim et al. | | |
| 2022/0210140 A1* | 6/2022 | Dhunay | ................. | G06N 20/00 |

OTHER PUBLICATIONS

Castro et al., "Does Fully Homomorphic Encryption Need Compute Acceleration?", arXiv:2112.06396 [cs.CR], Dec. 13, 2021, pp. 1-16.

(Continued)

*Primary Examiner* — David R Lazaro
*Assistant Examiner* — Xiang Yu
(74) *Attorney, Agent, or Firm* — NICHOLSON DE VOS WEBSTER & ELLIOTT LLP

(57) ABSTRACT

Method and apparatus to implement an integrated circuit (IC) device to perform homomorphic computing. In one embodiment, the IC device includes a memory array containing a plurality of memory cells to store data and compute circuitry to perform computations on encrypted data stored in the memory array. The memory array and the compute circuitry are integrated in a same die but at different die depth. At least a portion of the memory array overlaps a portion of the compute circuitry in a same x-y plane.

23 Claims, 21 Drawing Sheets

100

(56) References Cited

OTHER PUBLICATIONS

European Search Report and Search Opinion, EP App. No. 23159442.
5, Jul. 20, 2023, 11 pages.
Nazarian et al., "S4oC: A Self-Optimizing, Self-Adapting Secure
System-on-Chip Design Framework to Tackle Unknown Threats—A
Network Theoretic, Learning Approach", 2019 IEEE International
Symposium on Circuits and Systems (ISCAS), Oct. 12, 2020, 8
pages.
Ravichandiran et al., "A Review of 3D-Dynamic Random-Access
Memory based Near-Memory Computation", 2021 IEEE Interna-
tional 3D Systems Integration Conference (3DIC), Oct. 26, 2021, 6
pages.
Feldmann et al., "F1: A Fast and Programmable Accelerator for
Fully Homomorphic Encryption", MICRO'21, ACM, Oct. 18-22,
2021, pp. 238-252.
Office Action, EP App. No. 23159442.5, Sep. 11, 2025, 9 pages.

\* cited by examiner

System On A Chip 300

Compute Circuit(s) (e.g., Execution Engine Of A Processor Core(s)) 302

Cache 304

Memory Controller 306

Compression/Decompression Circuit(s) 312

Memory Peripheral Circuit(s) 370

Memory Array 390

Memory IC (e.g. on a single Die) 308

Main Memory 310

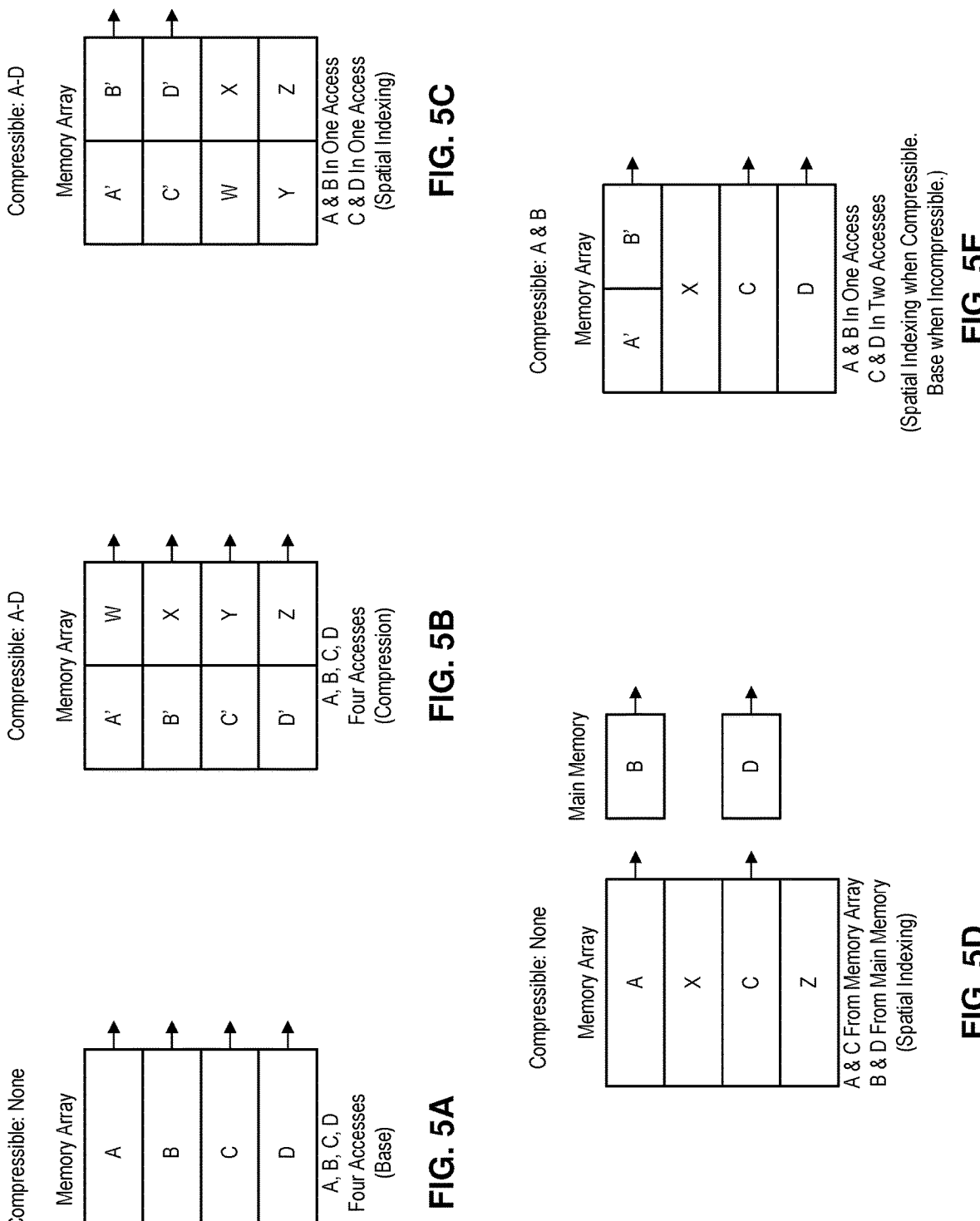

Compressible: None

Memory Array

| A |
| B |
| C |
| D |

A, B, C, D
Four Accesses
(Base)

FIG. 5A

Compressible: A-D

Memory Array

| A' | W |
| B' | X |
| C' | Y |
| D' | Z |

A, B, C, D
Four Accesses
(Compression)

FIG. 5B

Compressible: A-D

Memory Array

| A' | B' |
| C' | D' |
| W | X |
| Y | Z |

A & B In One Access
C & D In One Access
(Spatial Indexing)

FIG. 5C

Compressible: None

Memory Array                    Main Memory

| A |          | B |
| X |          | D |
| C |
| Z |

A & C From Memory Array
B & D From Main Memory
(Spatial Indexing)

FIG. 5D

Compressible: A & B

Memory Array

| A' | B' |
| X |
| C |
| D |

A & B In One Access
C & D In Two Accesses
(Spatial Indexing when Compressible.
Base when Incompressible.)

FIG. 5E

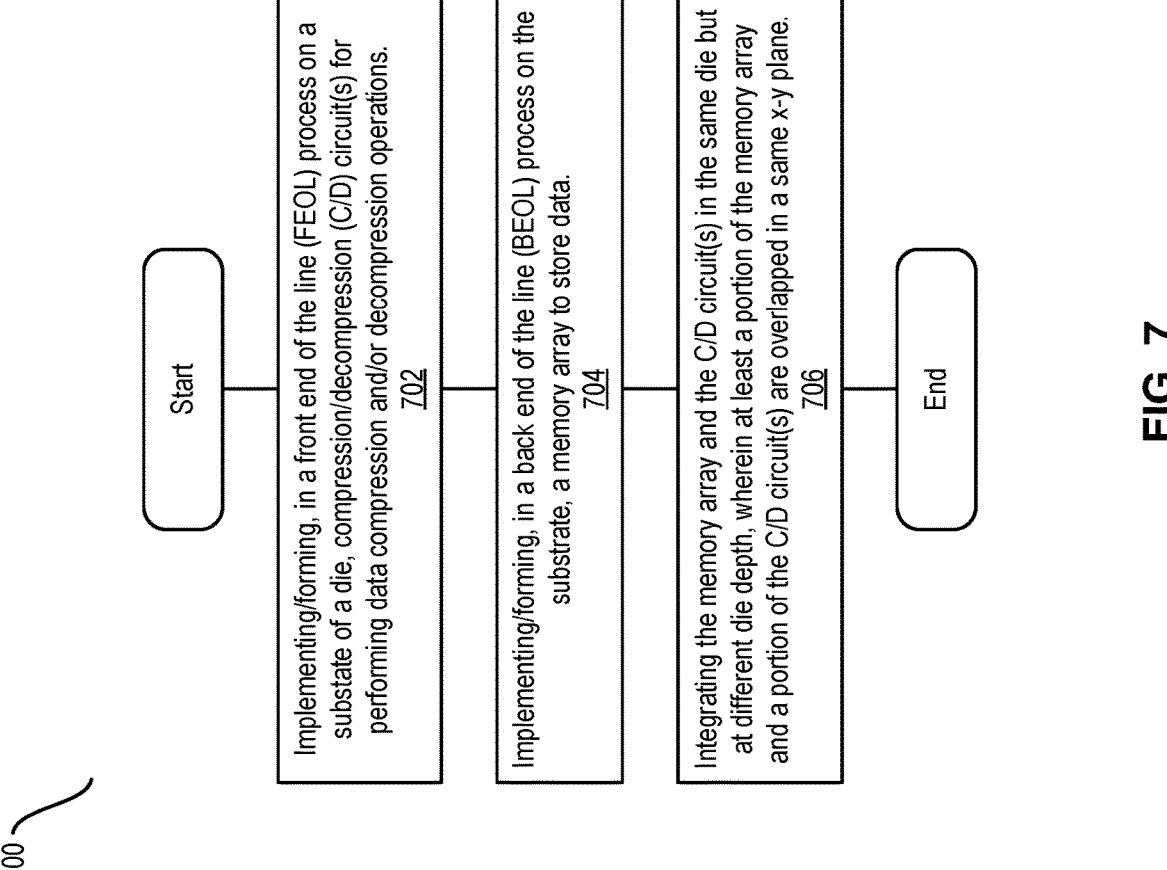

700

Start

Implementing/forming, in a front end of the line (FEOL) process on a substate of a die, compression/decompression (C/D) circuit(s) for performing data compression and/or decompression operations.
702

Implementing/forming, in a back end of the line (BEOL) process on the substrate, a memory array to store data.
704

Integrating the memory array and the C/D circuit(s) in the same die but at different die depth, wherein at least a portion of the memory array and a portion of the C/D circuit(s) are overlapped in a same x-y plane.
706

End

FIG. 7

System On A Chip
800C

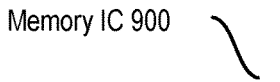

Memory IC 900

$OUT_N$    $OUT_3$    $OUT_2$    $OUT_1$ $\overline{OUT_N}$    $\overline{OUT_3}$    $\overline{OUT_2}$    $\overline{OUT_1}$ Bit Shifters 946

- ADD
- Horiz. OR
- OR (READ)
- NOR (NOT)

Shift Mask S (Levels 1 to 5)

$R_N$  . . .  $R_3$    $R_2$    $R_1$

Operation Selectors 944

Sequencing Circuit(s) (Controller)

. . .

Customized Sense Amplifiers + In-Memory Adders (1:N) 942

Flags, enables $\overline{BL_N}$   $BL_N$   $\overline{BL_3}$   $BL_3$   $\overline{BL_2}$   $BL_2$   $\overline{BL_1}$   $BL_1$  } 972

HC Circuit(s) 940

$WL_1$  Mem Cell  Mem Cell  Mem Cell  Mem Cell  992

Row Decoder A

Row Decoder B $WL_2$  Mem Cell  Mem Cell  Mem Cell  Mem Cell

. . .

$WL_M$  Mem Cell  Mem Cell  Mem Cell  Mem Cell  Scratch Space 994

Memory Array 990

Data In

Bitline Drivers

IPCB (Copy data to same column)    Enable Copy $OUT_N$  $\overline{OUT_N}$   $OUT_3$  $\overline{OUT_3}$   $OUT_2$  $\overline{OUT_2}$   $OUT_3$  $\overline{OUT_1}$ IPCB (Copy data to same column)    Enable Move $OUT_{N-F}$  $\overline{OUT_{N-F}}$   $OUT_{3-F}$  $\overline{OUT_{3-F}}$   $OUT_{2-F}$  $\overline{OUT_{2-F}}$   $OUT_{3-F}$  $\overline{OUT_{1-F}}$

FIG. 9

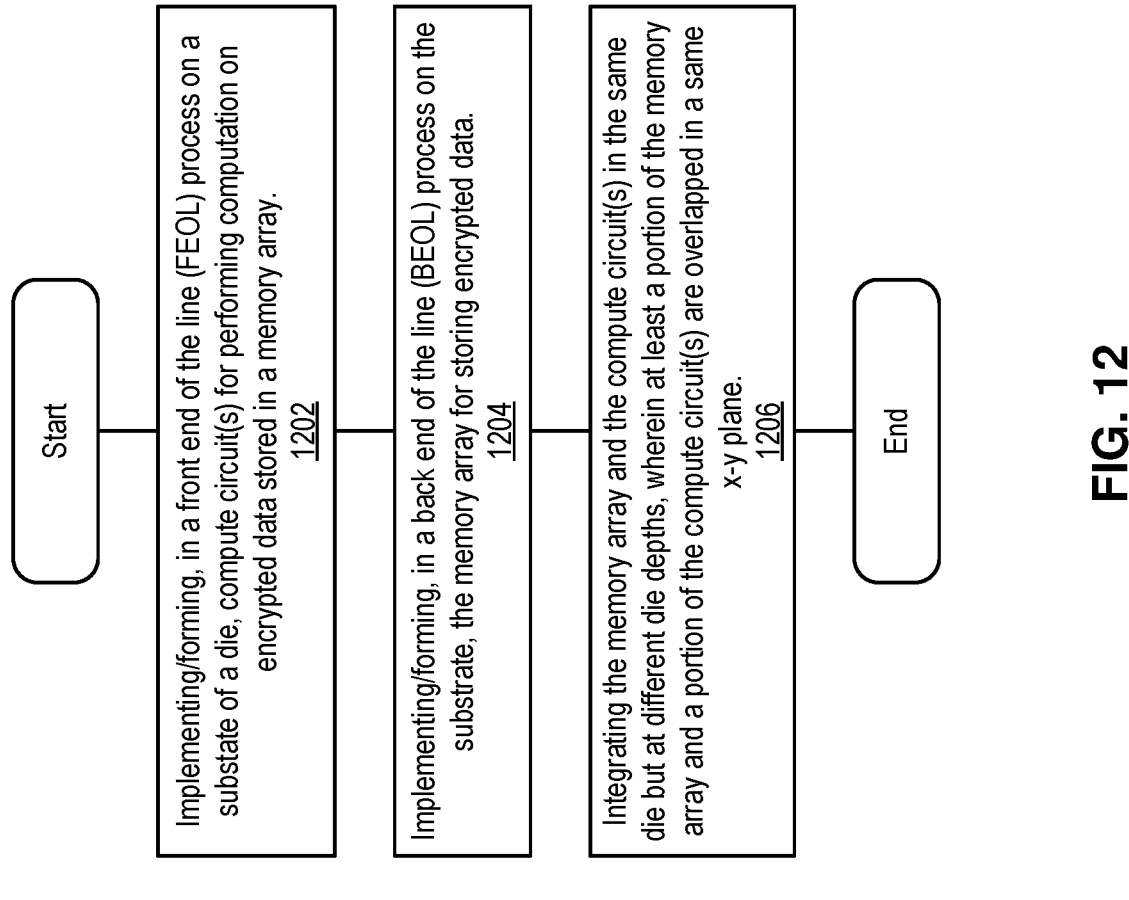

Start

Implementing/forming, in a front end of the line (FEOL) process on a substate of a die, compute circuit(s) for performing computation on encrypted data stored in a memory array.
1202

Implementing/forming, in a back end of the line (BEOL) process on the substrate, the memory array for storing encrypted data.
1204

Integrating the memory array and the compute circuit(s) in the same die but at different die depths, wherein at least a portion of the memory array and a portion of the compute circuit(s) are overlapped in a same x-y plane.
1206

End

APPARATUS AND METHOD TO IMPLEMENT HOMOMORPHIC ENCRYPTION AND COMPUTATION WITH DRAM

TECHNICAL FIELD

Embodiments of the invention described herein relate generally to the field of computer system. In particular, the disclosure relates to an apparatus and method to design more efficient dynamic random-access memory (DRAM) and integrated circuits.

BACKGROUND ART

Embedded memory is important to the performance of modern system on a chip (SoC) technology. Higher-density embedded memory technology, such as dynamic random-access memory (DRAM) and in particular, embedded DRAM (eDRAM), have been introduced to provide better performance and more features. However, increases in capacities and capabilities often comes with higher power and area requirements. Finding the right balance between them is typically an exercise in making difficult compromises. As such, advances in design and/or manufacturing that can improve performance without incurring significant penalties in power and area are always welcome.

BRIEF DESCRIPTION OF THE DRAWINGS

The invention may best be understood by referring to the following description and accompanying drawings that are used to illustrate embodiments of the invention. In the drawings:

FIGS. 5A-5E illustrate exemplary ways in which data may be stored to and accessed from the memory array in accordance with embodiments of the present disclosure;

FIG. 7 illustrates an exemplary method of implementing or forming a memory IC device (e.g., embedded DRAM) in accordance with embodiments of the present disclosure;

FIG. 9 is a circuit diagram illustrating an exemplary memory IC in accordance with some of the embodiments;

FIG. 12 illustrates an exemplary method of implementing or forming a memory IC device (e.g., embedded DRAM) in accordance with embodiments of the present disclosure;

DETAILED DESCRIPTION

Figure 1:
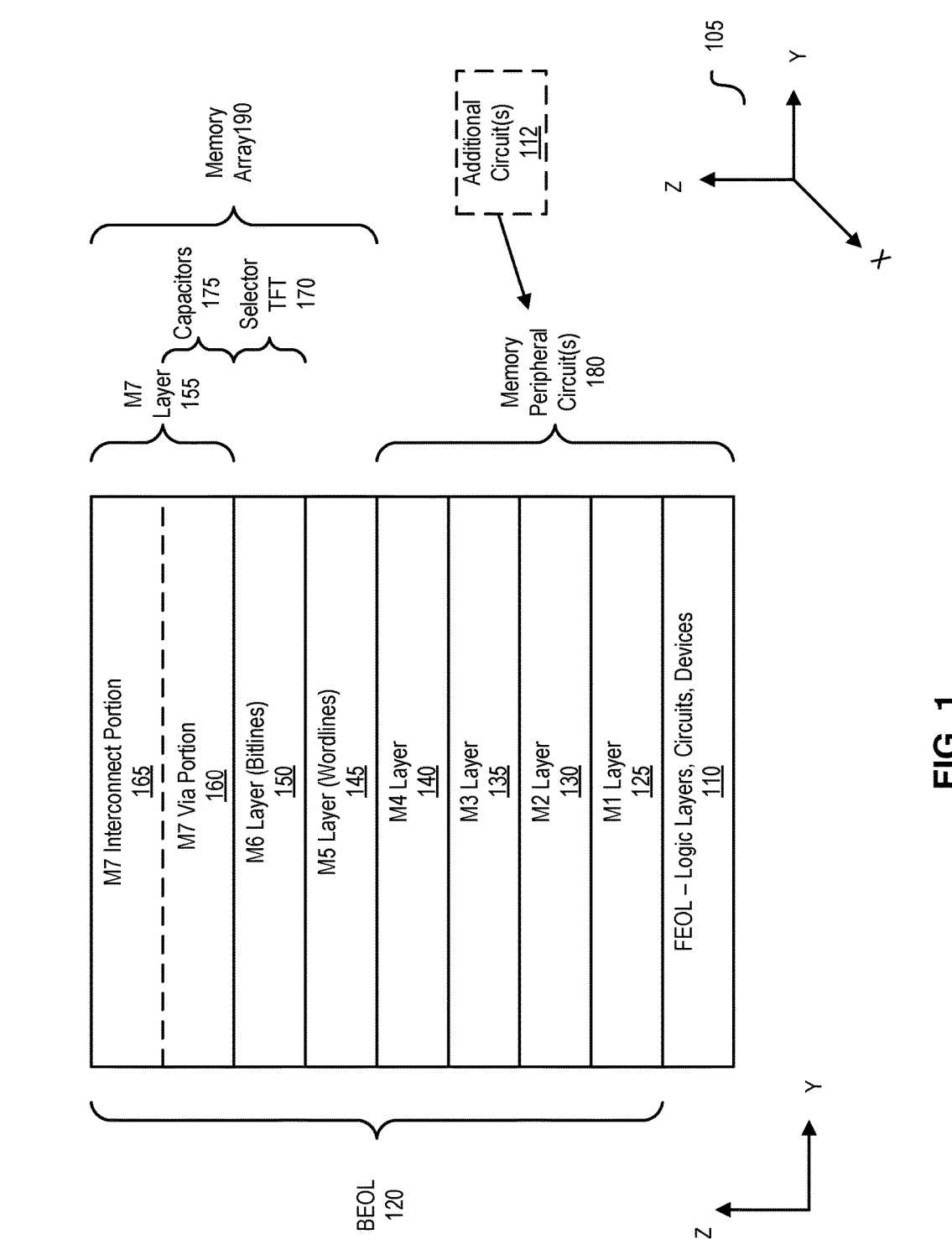
FIG. 1 provides a schematic illustration of a cross-sectional view of an Integrated Circuit (IC) device (e.g., a chip or memory IC) according to some embodiments of the present disclosure.

In the following description, numerous specific details are set forth. However, it is understood that embodiments of the invention may be practiced without these specific details. In other instances, well-known circuits, structures, and techniques have not been shown in detail in order not to obscure the understanding of this description.

Bracketed text and blocks with dashed borders (such as large dashes, small dashes, dot-dash, and dots) may be used to illustrate optional operations that add additional features to the embodiments of the invention. Such notation, however, should not be taken to mean that these are the only options or optional operations, and/or that blocks with solid borders are not optional in some embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similarly, unless explicitly stated otherwise, one feature disposed between two features may be in direct contact with the adjacent features or may have one or more intervening layers. A "set," as used herein, refers to any positive whole number of items including one item.

In the following description, various aspects of the illustrative implementations will be described using terms commonly employed by those skilled in the art to convey the substance of their work to others skilled in the art. For example, the terms "oxide," "carbide," "nitride," etc. may refer to compounds containing, respectively, oxygen, carbon, nitrogen, etc. In yet another example, a "high-k dielectric" may refer to a material having a higher dielectric constant (k) than silicon oxide, while a "low-k dielectric" may refer to a material having a lower k than silicon oxide. The terms "substantially," "close," "approximately," "near," and "about," generally refer to being within +/−20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5 to 20% of a target value based on the context of a particular value as described herein or as known in the art. As used herein, a "logic state" (or, alternatively, a "state" or a "bit" value) of a dynamic random-access memory (DRAM) (e.g., an embedded DRAM) memory cell may refer to one of a finite number of states that the cell can have, e.g., logic states "1" and "0," each state represented by a different voltage of the capacitor of the cell. In another example, as used herein, a "READ" and "WRITE" memory access or operations refer to, respectively, determining/sensing a logic state of a memory cell and programming/setting a logic state of a memory cell. In other examples, the term "connected" means a direct electrical or magnetic connection between the things that are connected, without any intermediary devices, while the term "coupled" means either a direct electrical or magnetic connection between the things that are connected or an indirect connection through one or more passive or active intermediary devices. The term "circuit" means one or more passive and/or active components that are arranged to cooperate with one another to provide a desired function. The terms "circuit," "circuit(s)," and "circuitry" may be used interchangeably herein.

Exemplary Embedded DRAM (eDRAM) Devices

Some embodiments of the present disclosure use embedded DRAM (eDRAM) memory cells and arrays, as well as corresponding methods and devices. An exemplary eDRAM memory array implements a memory cell that uses a thin-film transistor (TFT) as a selector transistor. One source/drain (S/D) electrode of the TFT is coupled to a capacitor for storing a memory state of the cell, while the other S/D electrode is coupled to a bitline. The bitline may be a shallow bitline in that a thickness of the bitline may be smaller than a thickness of one or more metal interconnects provided in the same metal layer as the bitline but used for providing electrical connectivity for components outside of the memory array. Such a bitline may be formed in a separate process than said one or more metal interconnects. In an embodiment, the memory cells may be formed in a back end of line process. Note that a memory cell is also referred to as a bit cell.

Some memory devices may be considered "standalone" devices in that they are included in a chip that does not also include computing logic (e.g., transistors for performing processing operations). Other memory devices may be included in a chip along with computing logic and may be referred to as "embedded" memory devices (e.g., eDRAM) or integrated circuit device (or simply integrated circuits). Using embedded memory to support computing logic may improve performance by bringing the memory and the computing logic closer together and eliminating interfaces that increase latency. Various embodiments of the present disclosure relate to embedded DRAM memory cells and corresponding methods and devices.

A standard eDRAM memory cell includes a capacitor for storing a bit (logical 1 or 0) and a selector transistor. Due to the leakage from the selector transistor, the capacitor is continuously refreshed to restore the voltage to an operational level. In some eDRAM approaches, the selector transistor is implemented as a logic transistor, e.g., a front end of line (FEOL), logic-process-based, selector transistor, creating multiple challenges.

FIG. 1 provides a schematic illustration of a cross-sectional view of an exemplary IC device (e.g., a chip or memory IC) 100, according to some embodiments of the present disclosure. FIG. 1 illustrates an exemplary coordinate system 105 with axes x-y-z so that the various planes illustrated in the figure and in some subsequent figures may be described with reference to this coordinate system, e.g., the view shown in FIG. 1 is in the y-z plane, as indicated with y and z axes shown at the lower left corner the figure. The coordinate system 105 is not shown in subsequent FIGS. in order to not clutter the drawings. The IC device 100 may be referred to as a TFT-eDRAM arrangement 100 because, as explained below, it will include a TFT-eDRAM included in one or more layers shown in the figure.

As shown in FIG. 1, the IC device 100 may include an FEOL 110 that includes most of the various logic layers, circuits, and devices to drive and control a logic IC. As also shown in FIG. 1, the IC device 100 also includes a back end of line (BEOL) 120 including, in the exemplary illustration of one embodiment of the present disclosure, seven metal interconnection layers: metal 1 (M1) layer 125, metal 2 (M2) layer 130, metal 3 (M3) layer 135, metal 4 (M4) layer 140, metal 5 (M5) layer 145, metal 6 (M6) layer 150, and metal 7 (M7) layer 155 that includes M7 interconnect portion 165 and M6 via portion 160. Various metal layers of the BEOL 120 may be used to interconnect the various inputs and outputs of the FEOL 110. Note that FEOL 110 may include a complementary metal-oxide-semiconductor (CMOS) logic transistor area in some embodiments. In other embodiments, the CMOS logic transistor area may be separate from, but in the same layer as, the FEOL 100.

Generally speaking, and specifically illustrated for the M7 layer 155, each of the metal layers of the BEOL 120, e.g., each of the layers M1-M7 shown in FIG. 1, may include a via portion and an interconnect portion typically provided above the via portion (but which may be provided below the via portion in other embodiments). The interconnect portion of a metal layer is configured for transferring signals along metal lines (also sometimes referred to as "trenches") extending in the x-y plane (e.g., in the x or y directions), while the via portion is configured for transferring signals through metal vias extending in the z direction, e.g., to any of the adjacent metal layers above or below. Accordingly, vias connect metal structures (e.g., metal lines or vias) from one metal layer to metal structures of an adjacent metal layer. While referred to as "metal" layers, layers M1-M7 include only certain patterns of conductive metals, e.g., copper (Cu) or aluminum (Al), or metal alloys, or more generally, patterns of an electrically conductive material, formed in an insulating medium such as interlayer dielectric (ILD). The insulating medium may include any suitable ILD materials such as silicon oxide, silicon nitride, aluminum oxide, and/or silicon oxynitride.

As shown in FIG. 1, the IC device 100 may be further divided into a memory array 190 and a memory peripheral circuit 180. The memory peripheral circuit 180 may be built in the FEOL 110 and lower metal layers of the BEOL 120, e.g., M1-M4 layers, to control (e.g., access (read/write), store, refresh) the memory array 190. The memory array 190 may be a TFT-eDRAM memory array built in higher metal layers of the BEOL 120, e.g., in M5-M7 layers. As such, the memory array 190 may include low-leakage selector TFTs 170 (e.g., in the M6 layers) and capacitors 175 (e.g., in the M7 via portion 160), as well as wordlines (e.g., row selectors, e.g., in the M5 layer 145) and bitlines (e.g., column selectors, e.g., in the M6 layer 150) making up the TFT-eDRAM memory cells.

Compared to other eDRAM designs that locate a memory control circuit in the same layers as a memory array but in a different macro (or x-y) area of the integrated circuit than the memory array (such as at a periphery of the memory array), the IC device 100 advantageously locates the memory peripheral circuit 180 below the memory array 190 (e.g., substantially in the same x-y area), thus saving valuable x-y area in the finished integrated circuit. In further detail, the IC device 100 may embed the TFT-eDRAM memory cells in higher metal layers, e.g., M5, M6, and M7 via portion layers shown in FIG. 1. For example, the M5 layer 145 can contain the wordlines extending in e.g., the x direction to select a row of memory cells (bits) while the M6 layer 150 can contain the bitlines extending in the y direction to sense/read each of the TFT-eDRAM memory cells (bits) in the selected row and/or to write memory data to any of the memory cells in the selected row. In particular, the selector TFTs 170 can be fabricated (e.g., in the M6 layer 150) above the wordlines (that serve as or connect to the gate electrodes or contacts of the selector TFTs 170) and below the bitlines (that serve as either source or drain (S/D) electrodes or contacts). For example, a given selector TFT 170 may have a transistor gate below the thin-film active layer (that can be formed at the bottom of the M6 layer 150, such as in the via portion) and source and drain contacts above the thin-film layer.

In some embodiments, the metal gate of the selector TFT in different memory cells may be connected to a continuous M5 line below, such as a copper (Cu)-based metal line, which may provide much lower resistance compared to gate lines formed in the lower (e.g., FEOL) portions of the IC device 100. The continuous M5 line may be used as the wordline of the memory array 190, and may be covered by diffusion barriers or diffusion barrier layers including dielectric layers, such as silicon nitride, silicon carbide, or the like, with vias filled with metal-diffusion barrier films like tantalum nitride (TaN), tantalum (Ta), titanium zirconium nitride (e.g., $Ti_xZr_{1-x}N$, such as X=0.53), titanium nitride (e.g., TiN), titanium tungsten (TiW), or the like. A metal gate layer may cover the diffusion barrier film-filled vias, which electrically connect the copper (Cu) wordline to the metal gates of the selector TFTs, the diffusion barrier film preventing or helping to prevent the diffusion or migration of copper (Cu) from the wordline to the rest of the selector TFTs. An active thin-film layer (e.g., indium gallium zinc oxide, or IGZO) and then source and drain contacts above the thin film layer use the M6 layer 150. The space between the source and drain contacts determines the gate length of the selector TFT. A capacitor 175 may be a three-dimensional MIM capacitor embedded in the M7 via portion 160 of the M7 layer 155, below the M7 interconnect portion 165).

Note that as illustrated, the memory peripheral circuits 180 occupy the FEOL 110 and lower metal interconnection layers of the BEOL 120, which are underneath the memory array 190. Since more than 35% of the eDRAM memory macro area can be consumed by the peripheral (memory control) circuits, substantial x-y macro area can be saved by fabricating the memory arrays 190 directly or substantially above the memory peripheral circuits 180, as is the case in one or more embodiments of the present disclosure. In other words, according to some embodiments of the present disclosure, a TFT-eDRAM memory array may be implemented with memory cells that occupy only the space in the upper metal layers (e.g., M5 layer and above) and peripheral circuits that are placed below the memory cells (e.g., in M4 layer and below, including the FEOL) to substantially reduce memory footprint area.

Additionally, the memory peripheral circuits 180 may be built to occupy less than the full space of the lower metal layers below the memory cells to allow the remaining space to be utilized for additional logic, circuit(s), circuitry, or device(s) to enhance the overall computing efficiency of the entire system. For example, the available space in the IC device may be occupied by one or more additional circuits 112 that interact with the memory peripheral circuit 180 and memory array 190 to provide better overall performance for the system implementing the IC device 100. In some embodiments, the one or more additional circuits 112 includes compression/decompression circuit(s), encryption/decryption circuit(s), and/or homomorphic compute circuit(s) as detailed herein below.

Figures 2A, 2B:
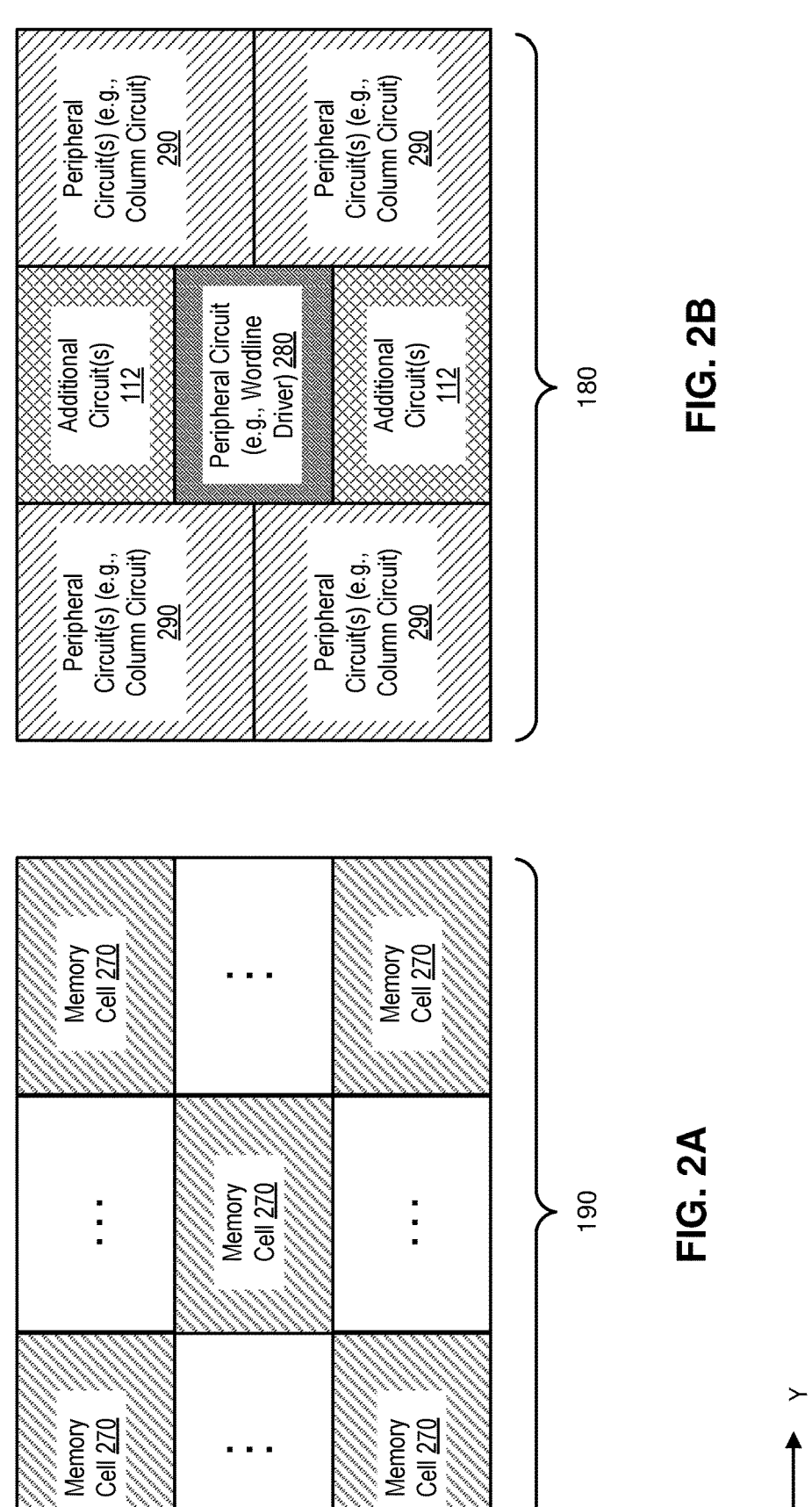
FIG. 2A-2B are plane (y-x) views of an example layout or floorplan of an integrated circuit (IC) device (e.g., TFT-eDRAM) with overlap of portions of the memory array, memory peripheral circuit, and one or more additional circuits in accordance with embodiments of the present disclosure.

FIGS. 2A-2B are plane (y-x) views of an example layout or floorplan of an integrated circuit (IC) device (e.g., TFT-eDRAM) with the memory array 190 overlapping at least portions of the memory peripheral circuit 180 and additional circuits 112 according to some embodiments of the present disclosure. The memory array 190 may include one or more memory cells 270 while the memory peripheral circuit 180 may include wordline drivers 280 and/or column circuits 290 as examples. Each of the column circuits 280 and bitline drivers 290 may further include devices such as read (bitline) sense amplifiers and pre-charging circuits. Note that the column circuits may also be referred to as Column Input/Output (I/O) modules/circuits.

FIG. 2A shows the memory array 190 which occupies the higher metal interconnection layers of the BEOL 120 (as illustrated in FIG. 1). As such, details of the memory peripheral circuit 180 underneath, which includes column circuits 290 and wordline drivers 280, are not visible in the top plane view of FIG. 2A. FIG. 2B, other the other hand, shows the memory peripheral circuits 180 occupying the FEOL 110 and lower metal interconnection layers of the BEOL 120 underneath the memory array 190 (as illustrated in FIG. 1). In other words, FIG. 2A is a representation of one of the layers of the memory array 190 (one of the layers M5-M7) or a combination of two or more layers thereof (e.g., M5 and M6 layers superimposed in a top-down view). Similarly, FIG. 2B is a representation of one of the layers of the memory peripheral circuit 180 (one of the layers M1-M4 or FEOL) or a combination of two or more layers thereof (e.g., M1 and FEOL layers superimposed in a top-down or bottom-up plane view).

Since more than 35% of the eDRAM memory macro area can be consumed by the peripheral (memory control) circuits, substantial savings of x-y macro area can be saved by fabricating the memory arrays 190 above the memory peripheral circuits 180, as demonstrated in one or more embodiments of the present disclosure. According to some embodiments of the present disclosure, an IC device (e.g., a TFT-eDRAM memory array 100) may be implemented with memory cells 190 occupying the space in the upper metal layers (e.g., M5 layer and above) and peripheral circuits 180 occupying the space below the memory array 190 (e.g., in M4 layer and below, including the FEOL) to substantially reduce memory footprint area. With the reduced footprint area, the open area may be used to implement other devices such as the one or more additional circuits 112.

Caching and Compression in DRAM for Capacity Improvement

By moving the peripheral circuits 180 directly underneath the memory array 190, and thereby bringing them physically closer to form shorter/tighter connections, significant gains in latency, power consumption, processing speed are realized. The close proximity between the memory array 190 and peripheral circuits 180 also allows for more complicated logic to be implemented without a significantly increase to the memory footprint area.

According to some embodiments of the present disclosure, additional circuit(s) 112, such as compression/decompression logic/circuit(s), are implemented in the space below the memory array 190 in the same die. The additional circuit(s) 112 may be implemented as part of the peripheral circuit(s) 180 or separately as a standalone unit within the FEOL and the lower metal layers. In some embodiments, the compression/decompression logic/circuits, or portions thereof, is implemented in the CMOS.

Figure 3:
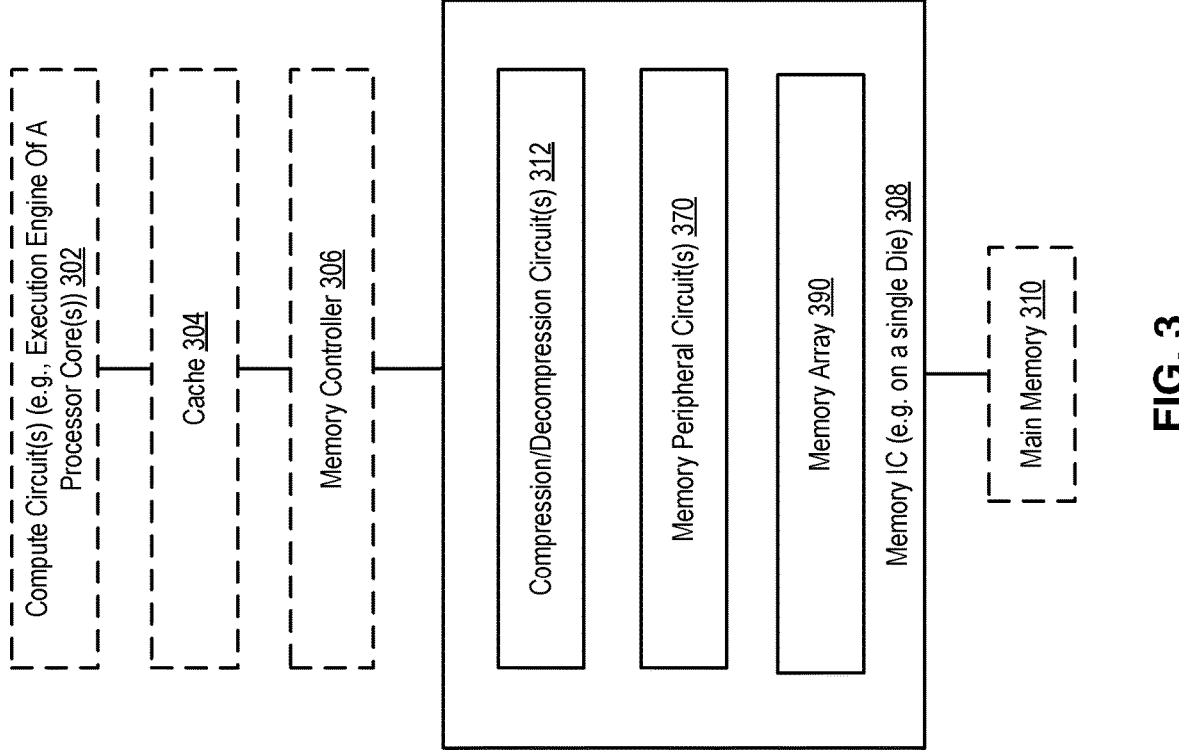
FIG. 3 illustrates a system on chip (SOC) on which embodiments of the present disclosure may be implemented.

FIG. 3 illustrates a system in which embodiments of the present disclosure may be implemented. The system on chip (SOC) 300 may include compute circuit(s) 302, memory IC device (memory IC) 308 and main memory 310. The compute circuit(s) 302 may include one or more processors, processor cores, central processing units (CPUs), graphics processing units (GPUs), field programmable gate arrays (FPGAs), etc. In some embodiments, the compute circuit(s) 302 is optionally associated with a cache 304 for storing frequently accessed data to help reduce the inherent latencies in memory accesses. While illustrated separately, in some embodiments, cache 304 may be included as part of the processing circuit(s) 302 (e.g., in the same die as the processing circuit(s)). Moreover, cache 304 may include, or be implemented as, any of the Level 1 (L1), Level 2 (L2), or Level 3 (L3) caches. In case of a cache miss, data required by the compute circuit(s) 302 may be fetched from the memory (e.g., memory IC 308 or main memory 310). In some embodiments, the memory accesses are managed by memory controller 306.

Memory IC 308, according to embodiments, is a new kind of memory (e.g., eDRAM) with faster access and compute capability over traditional memory. In some embodiments, memory IC 308 is implemented in a single die which is coupled to, but separate from, the die in which the compute circuit(s) 302 is implemented. The memory IC 308 may be used as an additional cache (e.g., Level 4 cache) to augment cache 304 or as a replacement for the L3 cache or Last Level Cache (LLC). The memory IC 308, like the eDRAM disclosed herein, may include memory array 390 comprising memory cells for storing data and memory peripheral circuit(s) 370 for accessing those data. The memory arrays 390 and the memory peripheral circuit(s) 370 may correspond, respectively, to the memory arrays 190 and the memory peripheral circuit(s) 180 disclosed above.

In some embodiments, memory IC 308 includes additional circuit(s) such as compression and/or decompression circuit(s) 312 to perform respective compression/decompression operations on data to be stored in, or read from, the memory array 390. The compression/decompression circuit(s) 312 may be implemented in or near the same layer(s), level(s), and/or depth(s) in the die as the memory peripheral circuit(s) 370. According to an embodiment, the compression/decompression circuit(s) 312 occupies at least a portion of the space underneath the memory array 390 in the memory IC 308. The overlap between the compression/decompression circuit(s) and the memory array in the same x-y plane enables additional capabilities in the memory IC with little to no increase in the physical footprint of the die. This arrangement also allows for a close connection between the memory cells and the circuit(s) directly underneath to reduce memory access latency. While shown in FIG. 3 as a single unit, the compression/decompression circuit(s) 312 may be implemented as separate compression circuit(s) and decompression circuit(s). In some embodiments, the compression circuit(s) and the decompression circuit(s) may be split between the memory IC 308 and the compute circuit(s) 302. In other words, the compression circuit(s) and the decompression circuit(s) need not both be implemented in the same die as the memory array 390.

Figure 4:
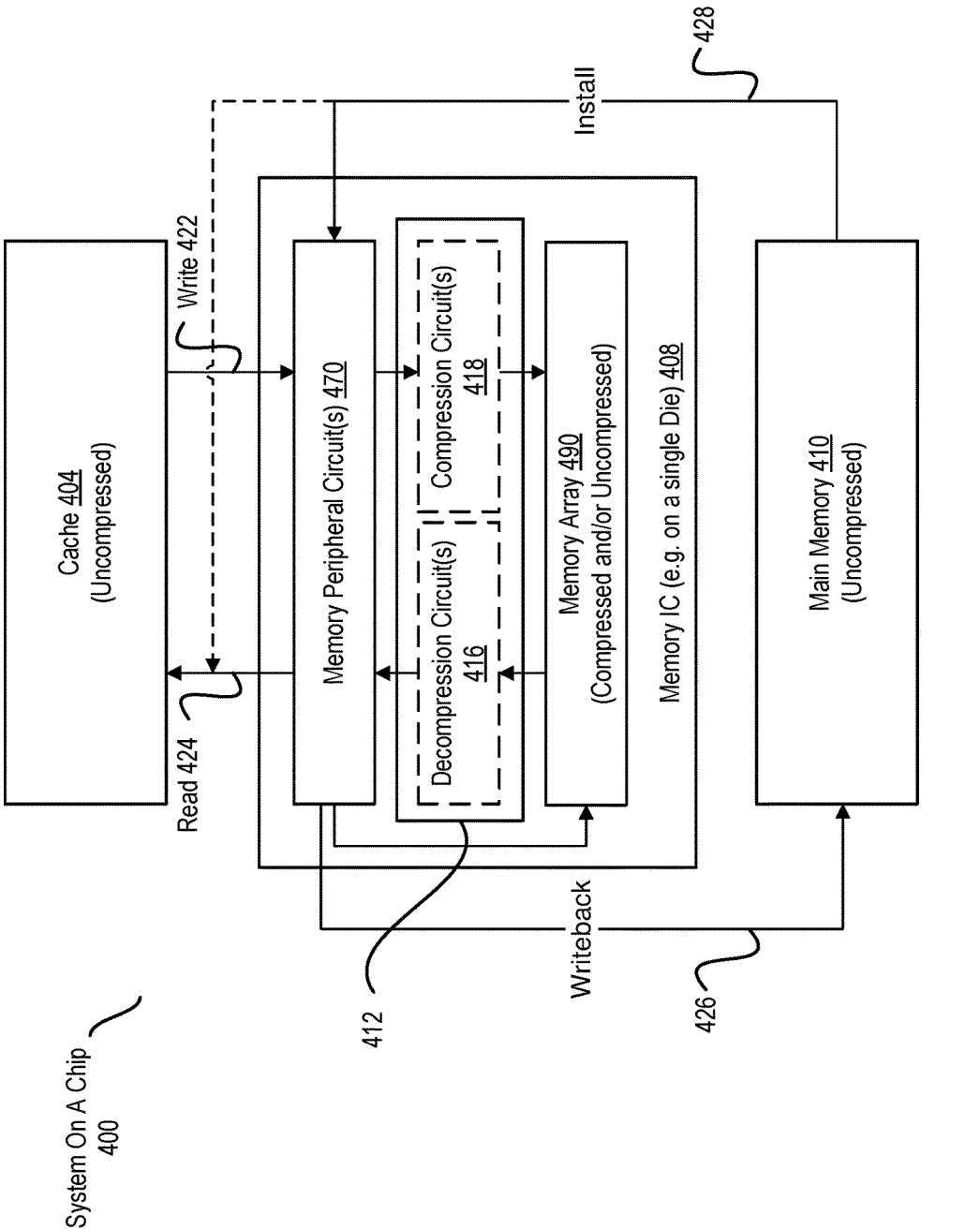
FIG. 4 is a block diagram illustrating the operations and flow of the memory IC in accordance with an embodiment.

FIG. 4 is a block diagram illustrating the operations and flow of the memory IC in accordance with an embodiment. SOC 400 includes cache 404, memory IC 408, and main memory 410 which may correspond respectively to cache 304, memory IC 308, and main memory 310 disclosed above. In one embodiment, memory IC 408 includes memory array 490, memory peripheral circuit(s) 470, and compression/decompression circuit(s) 412 in a single die. According to embodiments, memory array 490 is implemented at different die depths or layers as the memory peripheral circuit(s) 470 and/or the compression/decompression circuit(s) 412. For example, portions of the memory peripheral circuit(s) 470 and/or portions of the compression/decompression circuit(s) 412 may occupy the space directly underneath the memory array 490 to facilitate close connections between them. In some embodiments, at least some portions of the memory array 490 overlaps portions of the memory peripheral circuit(s) 470 and/or the compression/decompression circuit(s) 412 in the same x-y plane, but at different die depths or layers, to minimize the footprint of the memory IC.

Connected to memory IC 408 is cache 404, which may be associated with one or more processing circuit(s) (not shown) and configured to store data likely to be used by the associated processing circuit(s). According to an embodiment, data stored in cache 404 is uncompressed. In some embodiments, memory array 490 of memory IC 408 serves as the next level cache to cache 404. As such, data evicted from cache 404 may be stored to the memory array 490 via write 422. Data in the memory array may be stored into cache 404 responsive to a miss in cache 404. Read and write operations to the memory array 490 may be handled by a memory controller (not shown). The memory controller, or its functions, may be implemented as part of the memory peripheral circuit(s) 470 within the memory IC 408. Alternatively, the memory controller may be implemented as a component separate from the memory peripheral circuit(s) 470 or the memory IC 408.

To increase the storage capacity of the memory array 490, data from cache 404 may be compressed by the compression circuit(s) 418 before being stored into the memory array 490. In one embodiment, metadata or tag associated with the data includes one or more fields to indicate whether the associated data is compressible. The memory controller handling writes to the memory array 490 may decide, based on the values of the one or more fields, whether the data associated therewith should be directed to the compression circuit(s) to be compressed or be stored directly to the memory array 490. For example, compressible data are directed to the compression circuit(s) 418 to be compressed. Incompressible data, on the other hand, may be stored directly to the memory IC 408 as uncompressed data. According to an embodiment, memory array 490 is capable of storing both compressed and uncompressed data.

When memory array 490 reaches its storage capacity, data may be evicted and pushed to the main memory 410 via writeback 426. If the evicted data is compressed, it may be decompressed by the decompression circuit(s) 410 before it is stored to the main memory 410. In some embodiments, compressed data evicted form the memory array 490 may be stored to the main memory without decompression.

When data is requested, such as from a miss in cache 404, data may be retrieved from the memory array 490 through read request 424. According to an embodiment, responsive to the read request 424, the memory controller determines whether the requested data is stored in the memory array 490. If so, the memory controller may determine, based on the tag associated with the stored data, whether that data is compressed or uncompressed. If uncompressed, the stored data is retrieved from the memory array 490 and provided to cache 404 or the requestor (e.g., processing circuit(s) 302). If the stored data is compressed, it is first decompressed by the decompression circuit(s) 416 and then provided to cache 404 or the requestor.

If the data requested is not stored in memory array 490, the memory controller may direct the request to main memory 410. Next, the requested data is retrieved from main memory 410 and stored to memory array 490 via install 428. Based on the tag associated therewith, if the retrieved data is uncompressed, it may be compressed by the compression circuit(s) 418 before it is stored into memory array 490. If the retrieved data is already compressed, it may be stored into memory array 490 directly. From there, the newly installed data in memory array 490 is provided to cache 404 or the requestor to fill read request 424 as described above. In some embodiments, instead of using the installed data in the memory array 490 to fill read request 424, data retrieved from main memory 410 may be provided directly to cache 404 or the requestor to reduce the latency associated with data compression and decompression during the install into memory array 490.

FIGS. 5A-5E illustrate exemplary ways in which data may be stored to the memory array or accessed therefrom in accordance with embodiments of the present disclosure. In FIGS. 5A-5E, each row of the memory array represents the unit of data (e.g., word) that can be accessed in a single access. In FIG. 5A, data A-D are not compressible. Therefore, each piece of data is stored without compression in a respective row of the memory array. To access data A-D, 4 accesses are required as indicated by the four arrows. In FIG. 5B, each of the data A-D is compressible and therefore are stored in the memory array as compressed data A'-D'. Each of the compressed data A'-D' may potentially be stored in a row alongside other data (W-Z). As illustrated, data A is compressed (as A') and stored with W in a row of the memory array, data B is compressed (as B') and stored with X in a row of the memory array, and so on. Thus, to access data A-D, 4 accesses are required to retrieve A'-D' followed by decompression of the retrieved data. In contrast, in FIG.

5C, data A and B are compressed and stored together in a single row to take advantage of potential spatial locality between the data. Similarly, data C and D are compressed and stored in a single row. With this arrangement, compressed data A' and B' can be accessed in a single access and compressed data C' and D' can be accessed together in another access. FIG. 5D illustrates a similar scenario to that of FIG. 5A in which none of data A-D are compressible. However, in contrast with FIG. 5A, the storage of data A-D is split between the memory array and the main memory. As illustrated, uncompressed data A and C are stored in the memory array and uncompressed data B and D are stored in the main memory. To access data A-D, separate accesses to the memory array and the main memory are used. For example, data A is provided from the memory array in a first access, followed by an access to the main memory for data B. Then, data C is retrieved from the memory array in a third access and a fourth accesses obtains data D from the main memory. FIG. 5E illustrate a hybrid scenario in which the memory array is used to store both compressible data and incompressible data. According to an embodiment, data that are compressible (e.g., data A and B) are compressed and stored in the memory array whereas data that are incompressible (e.g., data C and D) are also stored in the memory array but without compression. As illustrated, data A and B, which are compressible, are compressed and stored in the same row as A' and B'. Data C and D, on the other hand, are incompressible and are therefore stored without compression and in separate rows. During data access, data A and B can be retrieved in a single access because they are stored in the same row whereas C and D are provided in separate accesses since they are stored in separate rows.

Figure 6:
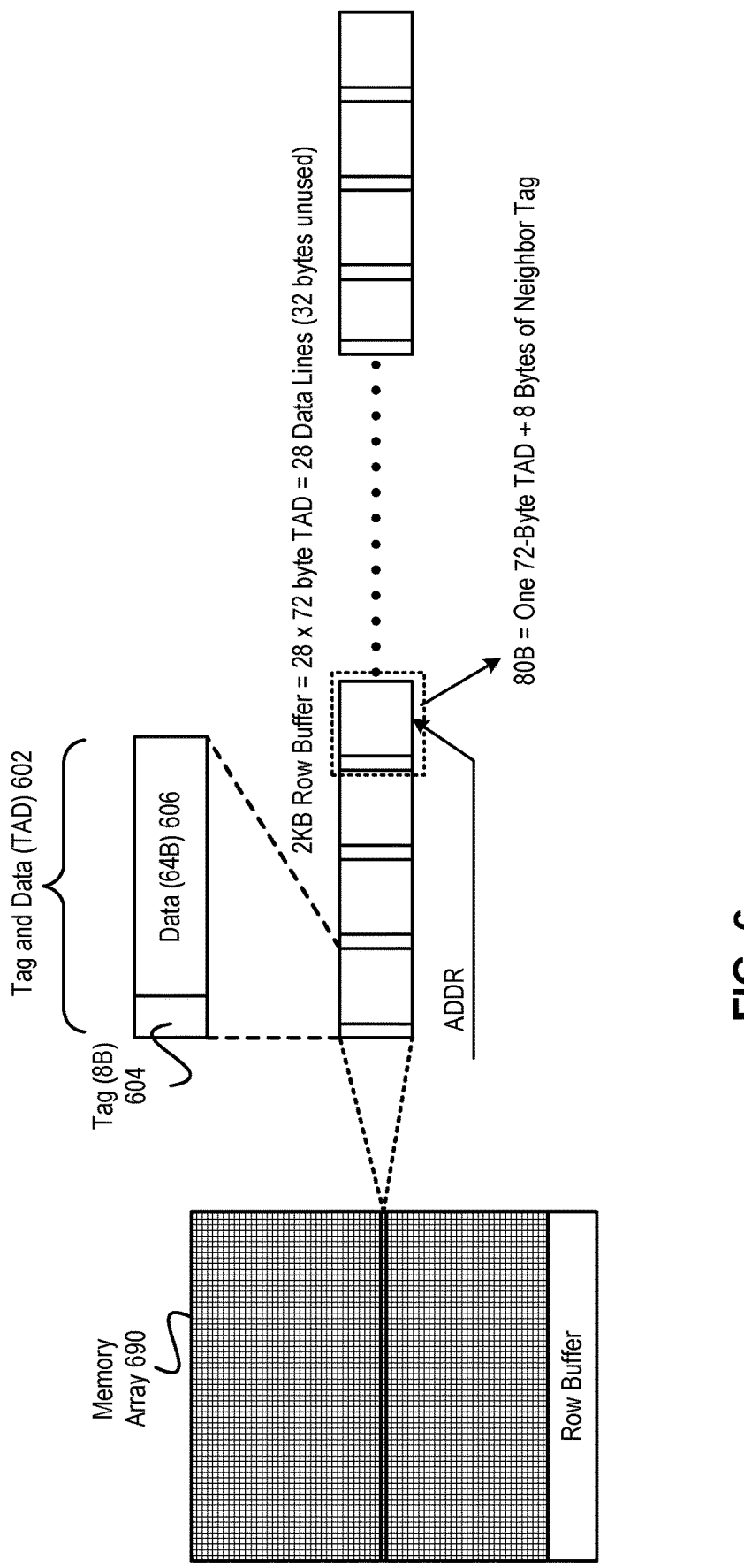
FIG. 6 illustrates the details of an exemplary memory array in accordance with some embodiments.

FIG. 6 illustrates the details of an exemplary memory array in accordance with some embodiments. Memory array 690 may include a plurality of memory cells arranged in rows. In operation, data may be stored and read from memory array 690 by rows. A row buffer may be used to temporarily store data during accesses. According to an embodiment, each row of the memory array stores a plurality of TADs or "Tag and Data" 602. As the name suggests, each TAD 602 may include a tag portion 604 and data portion 606. In the illustrated embodiment, the tag portion 604 is comprised of 8 bytes and the data portion 606 contains 64 bytes. Thus, assuming a row size of 2 KB, each row can store up to 28 TADs with 32 bytes unused (2048=72*28+32).

The tag of each TAD may contain information associated with the data of the TAD. For example, the tag may include a field to indicate whether the data of the TAD is compressible. In one embodiment, the same field or another field may indicate whether the data in the TAD is compressed or uncompressed. This information may be used by the memory controller and/or the compression/decompression circuit(s) to determine what operations should be performed on the data. While a particular embodiment is illustrated in FIG. 6 with specific byte sizes, one of ordinary skill in the art will recognize that the row size, tag size, and data size may be larger or smaller than the illustrated embodiment based on the desired implementation. The example is only provided herein to illustrate one of many possible embodiments and is not be intended to be limiting.

FIG. 7 illustrates an exemplary method 700 of implementing or forming a memory IC device (e.g., embedded DRAM) in accordance with embodiments of the present disclosure. Method 700 may be used to fabricate a memory IC with integrated device(s) or logic for performing compression and/or decompression operations, as discussed herein with respect to FIGS. 1-6.

Method 700 may begin at 702 with a process for implementing or forming logic devices or circuit(s) (e.g., transistors, capacitors, resistors, etc. such as the FEOL 110) in a FEOL process on the substrate of a die. The formed logic devices or circuit(s) may include compression and/or decompression circuit(s) for performing respective data compression and decompression operations. In some embodiments, the logic devices or circuit(s) may include just the compression circuit(s), just the decompression circuit(s), or both. The logic devices or circuit(s) formed in the process at 702 may subsequently be interconnected in a BEOL process. At 704, the method may include a process for implementing or forming a memory array (e.g., memory array 190) in a BEOL process on the substrate for storing data. According to an embodiment, data stored in the memory array is first compressed by the compression circuit(s). Moreover, data read from the memory array may be decompressed by the decompression circuit(s) before it is used.

At 706, the method may include a process of integrating the memory array and the compression/decompression circuit(s) in the same die or substrate but at different depth or layers. According to an embodiment, at least a portion of the memory array and a portion of the compression/decompression circuit(s) are overlapped in a same x-y plane. For example, portions of the memory array may be formed directly above portions of the compression/decompression during the BEOL process.

In some embodiments, the process to integrate the memory array and the compression/decompression circuit(s) in the same die or substrate include a process to form memory peripheral circuit(s) in the FEOL and/or the BEOL process. The memory peripheral circuit(s) may be used to control or enable various operations of the memory array. For example, the memory peripheral circuit(s) may be used to transmit data or data requests to and from the memory array, including transmissions between the memory array and the compression/decompression circuit(s). In some embodiments, the memory peripheral circuit(s) is used to control or manage such transmissions. For example, as disclosed above, controller circuit(s) of the memory peripheral circuit(s) may control whether data should be transmitted to the compression/decompression circuit(s) to be compressed or decompressed. In some embodiments, controller circuit(s) also control the transmission of data requests (e.g., reads and writes). For example, the controller circuitry may direct a read request to the memory array when the requested data is stored in the memory array. On the other hand, when the requested data is not in the memory array, the controller circuitry may block the read request and/or redirect it to a main memory. According to an embodiment, the read request may be initiated by a compute circuit(s) located on a different die than the memory array. The read request may also be initiated by a cache associated with the compute circuit(s).

Homomorphic Encryption and Computation with DRAM

Figure 8A:
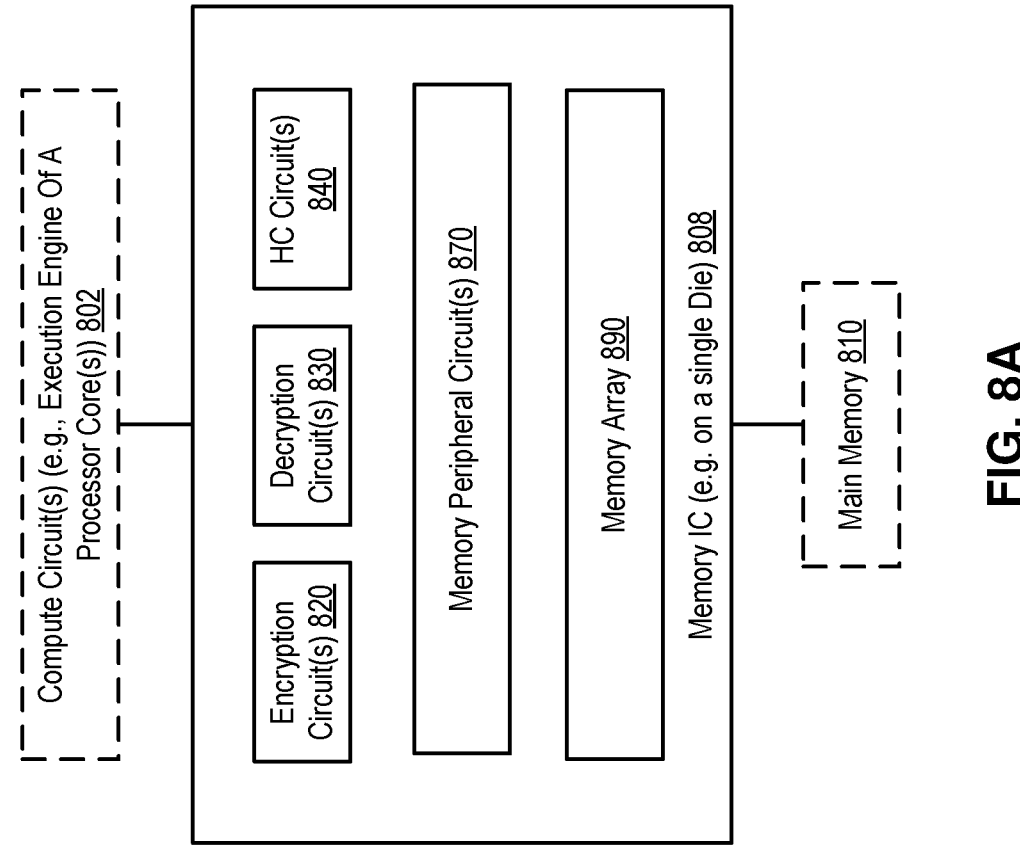
FIGS. 8A-8C illustrate exemplary systems on which embodiments of the present disclosure may be implemented.
Figure 8B:
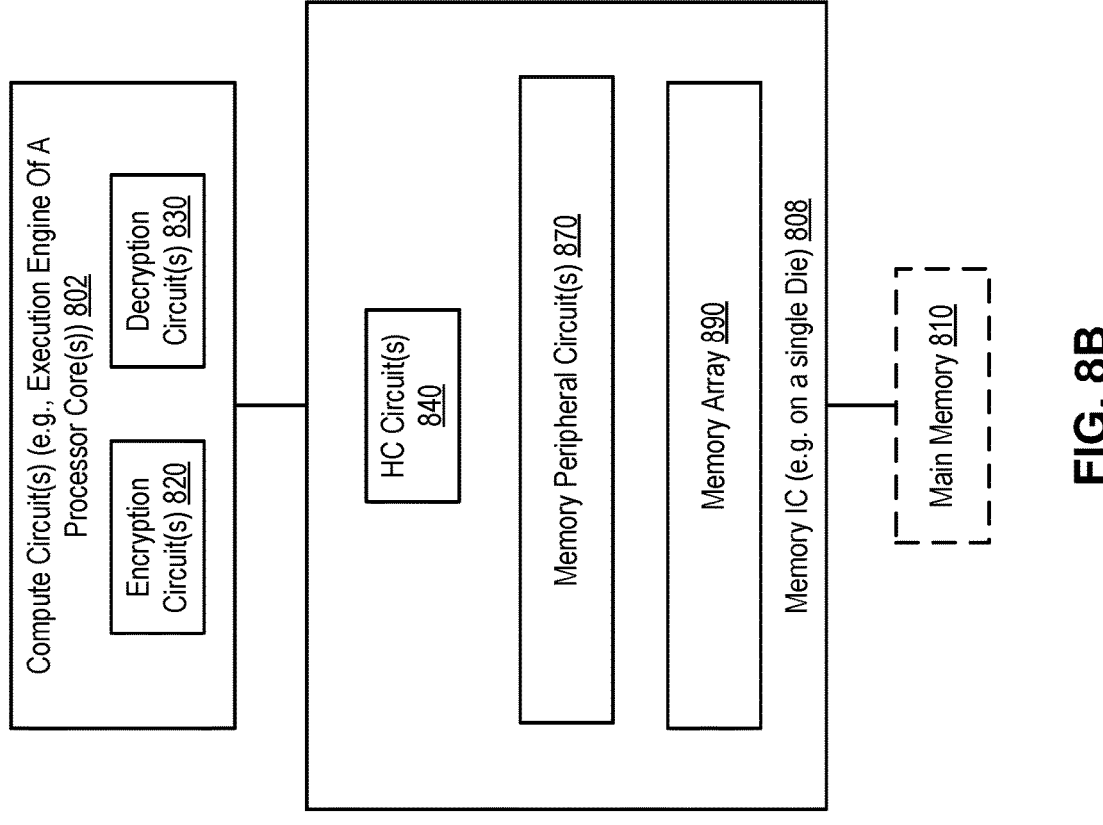
Figure 8C:
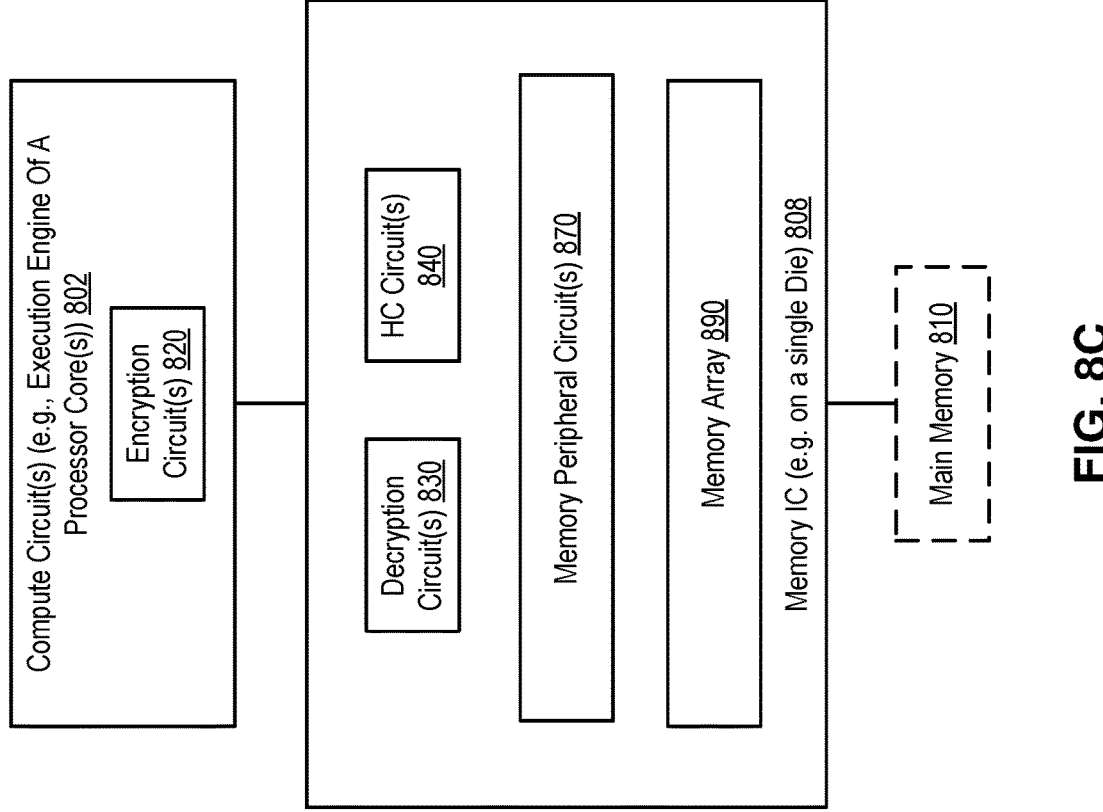

Instead of, or in addition to, the compression/decompression circuit(s) described above, the additional circuit(s) 112 in memory IC device 100 may include encryption, decryption, and/or homomorphic compute (HC) circuit(s) to enable homomorphic computing on the memory IC device. FIGS. 8A-8C illustrate several exemplary systems on which embodiments of the present disclosure may be implemented. In FIG. 8A, SOC 800A may include compute circuit(s) 802, memory IC 808, and main memory 810. The compute circuit(s) 802 may include one or more processors, processor cores, central processing units (CPUs), graphics processing units (GPUs), field programmable gate arrays (FPGAs), etc. The memory IC 808 may include memory peripheral circuit(s) 870 and memory array 890, similar to the memory peripheral circuit(s) 370 and memory array 390 of FIG. 3, respectively. However, instead of, or in addition to, the compression/decompression circuit(s) 312, memory IC 808 includes encryption circuit(s) 820, decryption circuit(s) 830, and homomorphic compute (HC) circuit(s) 840. Encryption circuit(s) 820 may encrypt the data received from compute circuit(s) 802 or main memory 810 to generate encrypted data, which may then be stored in the memory array 890 via memory peripheral circuit(s) 870. Decryption circuit(s) 830, on the other hand, may decrypt the encrypted data that are read from the memory array 890 via memory peripheral circuit(s) 870 to generate decrypted data. The encryption circuit(s) 820 and decryption circuit(s) 830 may utilize any suitable cryptography algorithms (e.g., AES, RSA, DES, etc.).

The HC circuit(s) 840 may perform various arithmetic and/or logic operations on encrypted data stored in the memory array 890, including, but not limited to, Add, OR, NOR, Horizontal OR, Invert, AND, Convolution, Multiply, etc. The HC circuit(s) 840 may read encrypted data from the memory array 808, perform one or more of the arithmetic and/or logic operations on the encrypted data without decrypting them, and store the results, which are still encrypted, back to the memory array 808.

According to an embodiment, the encryption circuit(s) 820, decryption circuit(s) 830, and HC circuit(s) 840 are implemented in the FEOL of the memory IC 808. The memory array 890, on the other hand, may be implemented in the upper levels of the BEOL of the memory IC 808. Memory peripheral circuit(s) 870, which may be implemented in the FEOL and lower levels of the BEOL, connect the memory array with the encryption circuit(s) 820, decryption circuit(s) 830, and HC circuit(s) 840. In one embodiment, encryption circuit(s) 820, decryption circuit(s) 830, and/or HC circuit(s) 840 are integrated in the same die (i.e. memory IC) as memory array 890 but at different depths or layers in the die. Portions of the encryption circuit(s) 820, decryption circuit(s) 830, and/or HC circuit(s) 840 may overlap portions of the memory array 890 in a same x-y plane. For example, according to an embodiment, portions of the encryption 820, decryption 830, and/or HC 840 circuit(s) are implemented directly below the memory array 890 and are connected therewith through the memory peripheral circuit(s) 870. This physical arrangement enables a close connection between the circuit(s) without a significant increase in the area footprint of the memory IC in the x- or y-direction, while at the same time minimizing the latency associated with data access.

In FIG. 8B, SOC 800B, similar to SOC 800A may include compute circuit(s) 802, memory IC 808, and main memory 810. However, in this embodiment, the encryption and decryption operations are not performed in the memory IC 808 and thus memory IC 808 only needs to include the HC circuit(s) 840 to perform arithmetic and/or logic operations on encrypted data stored in the memory array. The encryption 820 and decryption 830 circuit(s) may instead be implemented as part of the compute circuit(s) 802 or elsewhere outside of the memory IC (e.g., in an encryption/decryption accelerator). According to an embodiment, the HC circuit(s) 840 is integrated in the same die (i.e. memory IC) as memory array 890 but at different depths or layers in the die. In addition, portions of the HC circuit(s) 840 may overlap portions of the memory array 890 in a same x-y plane. For example, according to an embodiment, portions of the HC circuit(s) 840 is implemented directly below portions of the memory array 890 and are connected therewith through the memory peripheral circuit(s) 870. This arrangement may be advantageous when more powerful, efficient, and/or complex encryption/decryption operations are available or needed than what can be provided by the logic device(s) in the memory IC 808. Furthermore, since data transmitted between the memory IC 808 and compute circuit(s) 802 remains encrypted, a high level of security is maintained.

During operation of the SOC 800B, data are encrypted outside of the memory IC 808 by encryption circuit(s) 820. The encrypted data are then stored to the memory array 890 in the memory IC 808. Subsequently, the HC circuit(s) 840 of the memory IC 808 accesses and performs homomorphic operations on the stored encrypted data and writes the results back into the memory array 890. The results, which remain encrypted, may later be retrieved and decrypted by the decryption circuit 830 for use by the compute circuit(s) 802.

FIG. 8C illustrates yet another exemplary system in which data encryption is performed outside of the memory IC 808. SOC 800C may include compute circuit(s) 802, memory IC 808, and main memory 810 just like SOCs 800A and 800B. The memory IC 808 may include memory peripheral circuit(s) 870 and memory array 890, as well as decryption circuit(s) 830 and HC circuit(s) 840. According to an embodiment, the data encryption is performed outside of memory IC 808. As such, encryption circuit(s) 820 may be implemented in the compute circuit(s) 802 or elsewhere in the SOC 800C. This arrangement may provide HC circuit(s) 840 with the option to operate on encrypted data as well as decrypted data. For example, HC circuit(s) 840 may access and perform homomorphic computing operations on encrypted data stored in the memory array 890 as described above with respect to FIGS. 8A and 8B. Optionally, encrypted data stored in the memory array 890 may first be decrypted by the decryption circuit(s) 830 and the result is operated on by HC circuit(s) 840 in decrypted form. Thus, according to an embodiment, the HC circuit(s) 840 may perform arithmetic and logic operations on encrypted, decrypted, and unencrypted data.

In accordance with an embodiment, decryption circuit(s) 830 and HC circuit(s) 840 are integrated in the same die (i.e. memory IC) as memory array 890 but at different depths or layers in the die. Portions of the decryption circuit(s) 830 and/or the HC circuit(s) 840 may overlap portions of the memory array 890 in a same x-y plane. For example, according to an embodiment, portions of the decryption 830 and/or the HC 840 circuit(s) are implemented directly below the memory array 890 and are connected therewith through the memory peripheral circuit(s) 870.

FIG. 9 is a circuit diagram illustrating an exemplary memory IC in accordance with some embodiments. Memory IC 900 may include memory array 990 and HC circuit(s) 940 similar to those described above. The memory array 990 may include a plurality of memory cells 992 which may be arranged in rows and columns. Some of the memory cells 992 may be used as scratch space 994 (i.e. row buffer). The memory cells 992 may be connected to the HC circuit(s) 940 through connections such as bit lines 972. The HC circuit(s) 940 may include customized sense amplifiers and in-memory adders 942 as well as operation selectors 944 and bit shifters 946, for selecting and performing various arithmetic and/or logic operations. According to an embodiment, the HC circuit(s) 940 may perform general computing operations as well as homomorphic computing operations, depending on the data set to be operated on. For example, a data block (e.g., TAD) stored in the memory arrays may have fields in the tag portion to indicate whether the data in the data portion of the TAD is encrypted. The HC circuit(s) 940 may then perform the appropriate compute (e.g., general or homomorphic) operations based on these fields.

Figure 10:
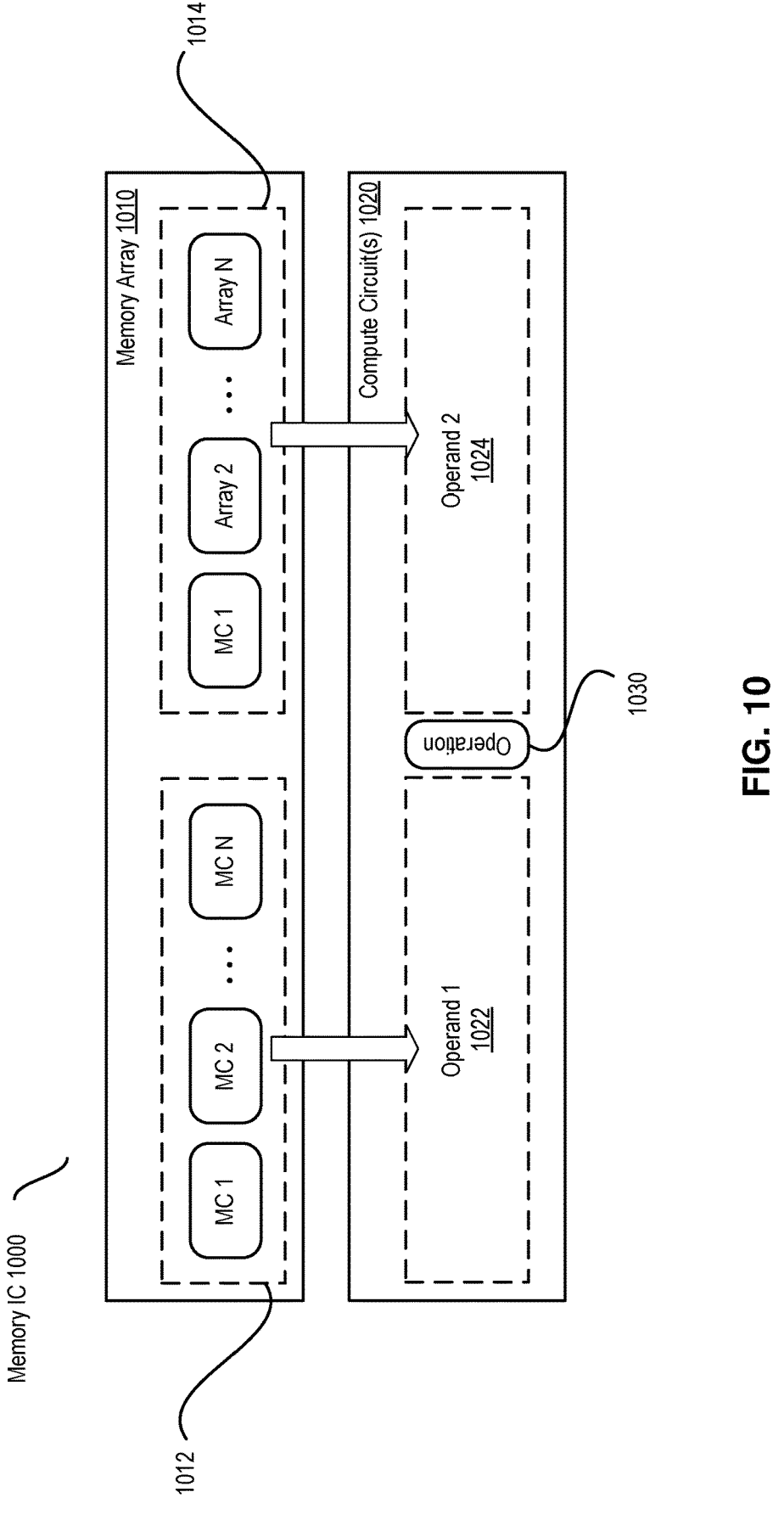
FIG. 10 is a block diagram illustrating an embodiment of an exemplary memory IC.
Figure 11:
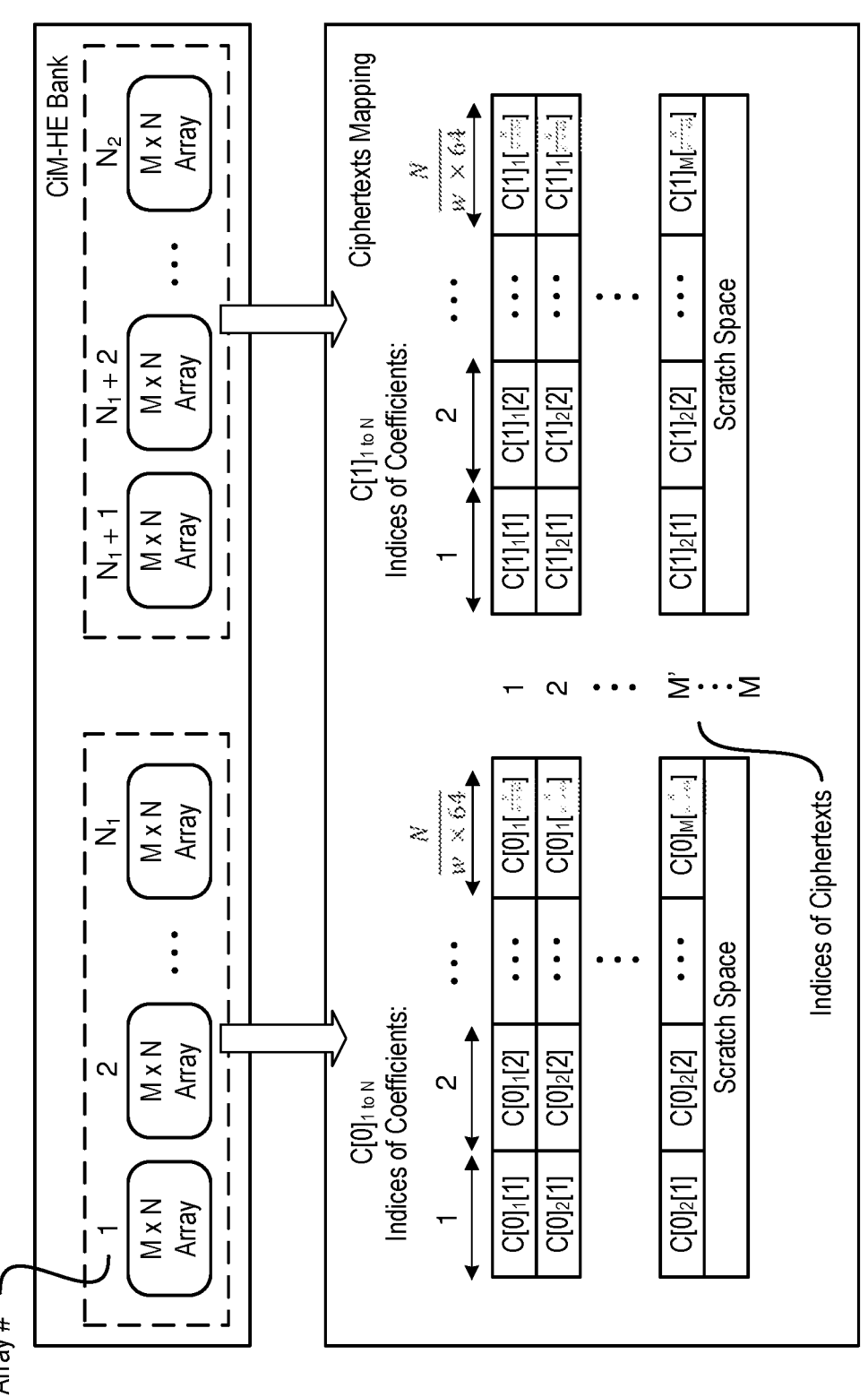
FIG. 11 illustrates the details of a homomorphic operation between specific blocks of data in the memory array according to an embodiment.

As disclosed previously, one advantage of integrating the compute circuit(s) and memory array in a same memory IC device or die is to reduce latency. The close proximity between the compute circuit(s) and memory array also enables larger number of connections to be made between them. In some embodiments, operands to a compute operation are stored into specific locations within the memory array to take advantage of the physical locality. As illustrated in FIG. 10, memory array 1010 of memory IC 1000 may include a first block 1012 comprising a first set of memory cells and a second block 1014 comprising a second set of memory cells. Compute circuit(s) 1020 for performing a certain compute operation may be implemented directly underneath the memory array 1010, such as in the FEOL. The circuit(s) for reading operand 1 1022 may be directly aligned with the first set of memory cells 1012 and the circuit(s) for reading operand 2 may be directly aligned with the second set of memory cells 1014. Thus, according to an embodiment, data associated with first operand 1022 is specifically stored into the first block of memory cells 1012 and data associated with the second operand 1024 is specifically stored into the second block of memory cells 1014. This enables low-latency access of the operands to perform operation 1030 and/or minimize the use of row buffers or scratch pad area. For example, if the operation 1030 is matrix multiplication, then values associated with the first matrix may be stored into the first block of memory cells and values associated with the second matrix may be stored into the second block of memory cells. Then compute circuit(s) for matrix multiplication that is implemented underneath the two memory cell blocks can access and perform the operation with minimal latency. FIG. 11 illustrates the details of a homomorphic operation between specific blocks of data in the memory array according to an embodiment.

FIG. 12 illustrates an exemplary method 1200 of implementing or forming a memory IC device (e.g., embedded DRAM) in accordance with embodiments of the present disclosure. Method 1200 may be used to fabricate a memory IC with integrated device(s) or logic for performing homomorphic computing operations.

Method 1200 may begin at 1202 with a process for implementing or forming logic devices or circuit(s) (e.g., transistors, capacitors, resistors, etc. such as the FEOL 110) in a FEOL process on the substrate of a die. The formed logic devices or circuit(s) may include (homomorphic) compute circuit(s) for performing arithmetic and/or logic operations on encrypted data. In some embodiments, the formed logic devices or circuit(s) may also include encryption and/or decryption circuit(s) for performing respective data encryption and decryption operations. The logic devices or circuit(s) formed in the process at 1202 may subsequently be interconnected in a BEOL process. At 704, the method may include a process for implementing or forming a memory array (e.g., memory array 190) in a BEOL process on the substrate for storing data. According to an embodiment, data stored in the memory array may be encrypted by the encryption circuit(s). Moreover, encrypted data that are read from the memory array may be decrypted by the decryption circuit(s).

At 1206, the method may include a process of integrating the memory array and the compute circuit(s) in the same die or substrate but at different depth or layers. According to an embodiment, at least a portion of the memory array and a portion of the compute circuit(s) are overlapped in a same x-y plane. For example, portions of the memory array may be formed directly above portions of the compute circuit(s) during the BEOL process. The same arrangement may be implemented with respect to encryption and decryption circuit(s). Portions of the memory array may overlap portions of the encryption circuit(s) and/or the decryption circuit(s). Portions of the memory array may be formed directly above portions of the encryption circuit(s) and/or the decryption circuit(s) during the BEOL process on the substrate. In some embodiments, the process to integrate the memory array and the compute circuit(s) in the same die or substrate include a process to form memory peripheral circuit(s) in the FEOL and/or the BEOL process. The memory peripheral circuit(s) may be used to control or enable various operations of the memory array including data transmission and management. For example, the memory peripheral circuit(s) may be used to transmit data to and from the memory array, including transmissions between the memory array, encryption circuit(s), decryption circuit(s), and compute circuit(s). In some embodiments, the memory peripheral circuit(s) is used to control and manage such transmissions.

Exemplary Processor Architectures and Data Types

Figures 13A, 13B:
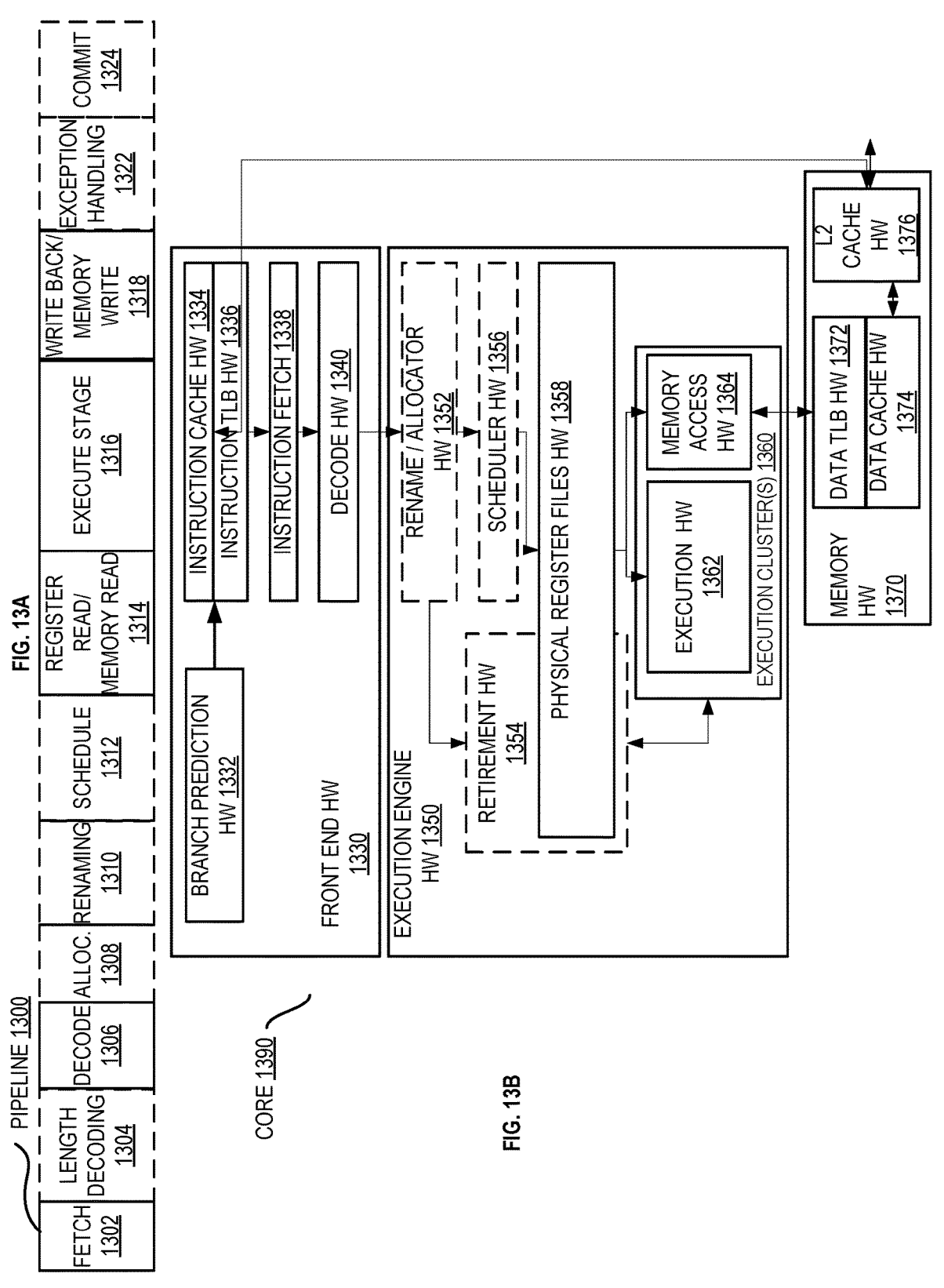
FIG. 13A is a block diagram illustrating both an exemplary in-order pipeline and an exemplary register renaming, out-of-order issue/execution pipeline according to embodiments of the invention.
FIG. 13B is a block diagram illustrating both an exemplary embodiment of an in-order architecture core and an exemplary register renaming, out-of-order issue/execution architecture core to be included in a processor according to embodiments of the invention.

FIG. 13A is a block diagram illustrating both an exemplary in-order pipeline and an exemplary register renaming, out-of-order issue/execution pipeline according to embodiments of the invention. FIG. 13B is a block diagram illustrating both an exemplary embodiment of an in-order architecture core and an exemplary register renaming, out-of-order issue/execution architecture core to be included in a processor according to embodiments of the invention. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end hardware 1330 coupled to an execution engine hardware 1350, and both are coupled to a memory hardware 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end hardware 1330 includes a branch prediction hardware 1332 coupled to an instruction cache hardware 1334, which is coupled to an instruction translation lookaside buffer (TLB) 1336, which is coupled to an instruction fetch hardware 1338, which is coupled to a decode hardware 1340. The decode hardware 1340 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode hardware 1340 or otherwise within the front end hardware 1330). The decode hardware 1340 is coupled to a rename/allocator hardware 1352 in the execution engine hardware 1350.

The execution engine hardware 1350 includes the rename/allocator hardware 1352 coupled to a retirement hardware 1354 and a set of one or more scheduler hardware 1356. The scheduler hardware 1356 represents any number of different schedulers, including reservations stations, central instruction window, etc. The scheduler hardware 1356 is coupled to the physical register file(s) hardware 1358. Each of the physical register file(s) hardware 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 1358 comprises a vector registers hardware, a write mask registers hardware, and a scalar registers hardware. This register hardware may provide architectural vector registers, vector mask registers, and general purpose registers. The physical register file(s) hardware 1358 is overlapped by the retirement hardware 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 1354 and the physical register file(s) hardware 1358 are coupled to the execution cluster(s) 1360. The execution cluster(s) 1360 includes a set of one or more execution hardware 1362 and a set of one or more memory access hardware 1364. The execution hardware 1362 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 1356, physical register file(s) hardware 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 1364). It should also be understood that where separate pipelines are used, one or more of these pipelines may be out-of-order issue/execution and the rest in-order.

The set of memory access hardware 1364 is coupled to the memory hardware 1370, which includes a data TLB hardware 1372 coupled to a data cache hardware 1374 coupled to a level 2 (L2) cache hardware 1376. In one exemplary embodiment, the memory access hardware 1364 may include a load hardware, a store address hardware, and a store data hardware, each of which is coupled to the data TLB hardware 1372 in the memory hardware 1370. The instruction cache hardware 1334 is further coupled to a level 2 (L2) cache hardware 1376 in the memory hardware 1370. The L2 cache hardware 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode hardware 1340 performs the decode stage 1306; 3) the rename/allocator hardware 1352 performs the allocation stage 1308 and renaming stage 1310; 4) the scheduler hardware 1356 performs the schedule stage 1312; 5) the physical register file(s) hardware 1358 and the memory hardware 1370 perform the register read/memory read stage 1314; the execution cluster 1360 perform the execute stage 1316; 6) the memory hardware 1370 and the physical register file(s) hardware 1358 perform the write back/memory write stage 1318; 7) various hardware may be involved in the exception handling stage 1322; and 8) the retirement hardware 1354 and the physical register file(s) hardware 1358 perform the commit stage 1324.

The core 1390 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1390 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 1334/1374 and a shared L2 cache hardware 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 14:
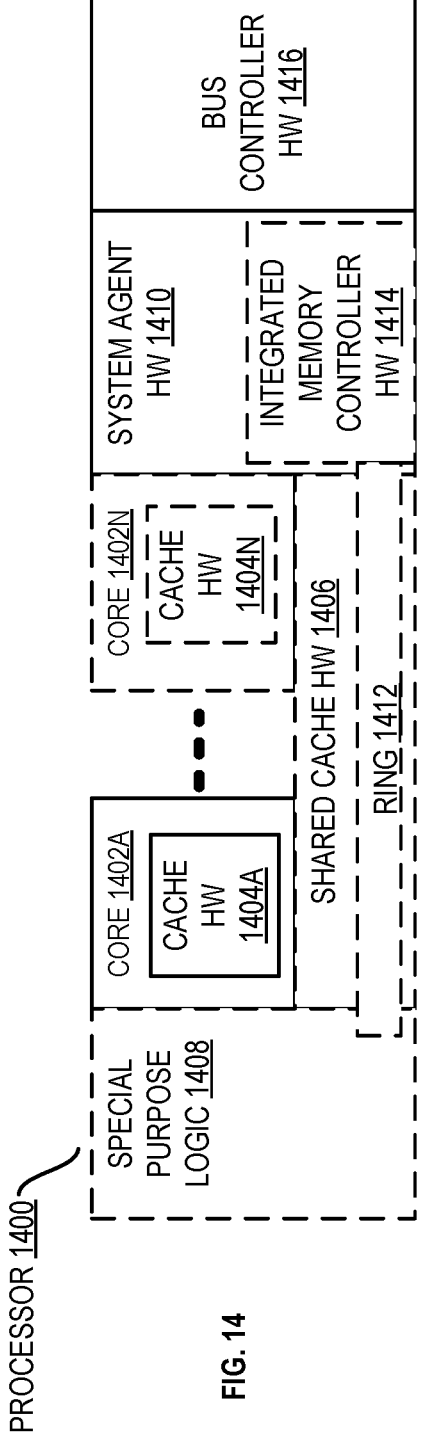
FIG. 14 is a block diagram of a single core processor and a multicore processor with integrated memory controller and graphics according to embodiments of the invention.

FIG. 14 is a block diagram of a processor 1400 that may have more than one core, may have an integrated memory controller, and may have integrated graphics according to embodiments of the invention. The solid lined boxes in FIG. 14 illustrate a processor 1400 with a single core 1402A, a system agent 1410, a set of one or more bus controller hardware 1416, while the optional addition of the dashed lined boxes illustrates an alternative processor 1400 with multiple cores 1402A-N, a set of one or more integrated memory controller hardware 1414 in the system agent hardware 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1406, and external memory (not shown) coupled to the set of integrated memory controller hardware 1414. The set of shared cache hardware 1406 may include one or more mid-level caches, such as level 2 (L2), level 3 (L3), level 4 (L4), or other levels of cache, a last level cache (LLC), and/or combinations thereof. While in one embodiment a ring based interconnect hardware 1412 interconnects the integrated graphics logic 1408, the set of shared cache hardware 1406, and the system agent hardware 1410/integrated memory controller hardware 1414, alternative embodiments may use any number of well-known techniques for interconnecting such hardware. In one embodiment, coherency is maintained between one or more cache hardware 1406 and cores 1402-A-N.

In some embodiments, one or more of the cores 1402A-N are capable of multithreading. The system agent 1410 includes those components coordinating and operating cores 1402A-N. The system agent hardware 1410 may include for example a power control unit (PCU) and a display hardware. The PCU may be or include logic and components needed for regulating the power state of the cores 1402A-N and the integrated graphics logic 1408. The display hardware is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set. In one embodiment, the cores 1402A-N are heterogeneous and include both the "small" cores and "big" cores described below.

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
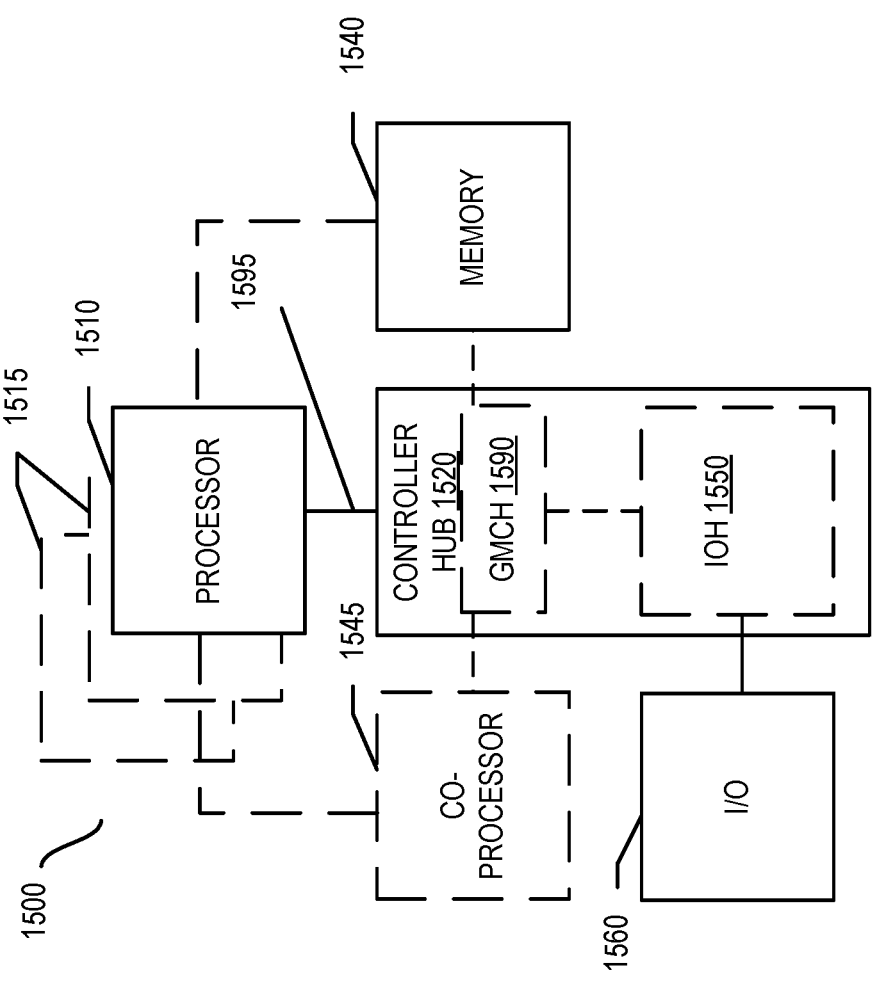
FIG. 15 illustrates a block diagram of a system in accordance with one embodiment of the present invention.

Referring now to FIG. 15, shown is a block diagram of a system 1500 in accordance with one embodiment of the present invention. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 is couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface, or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
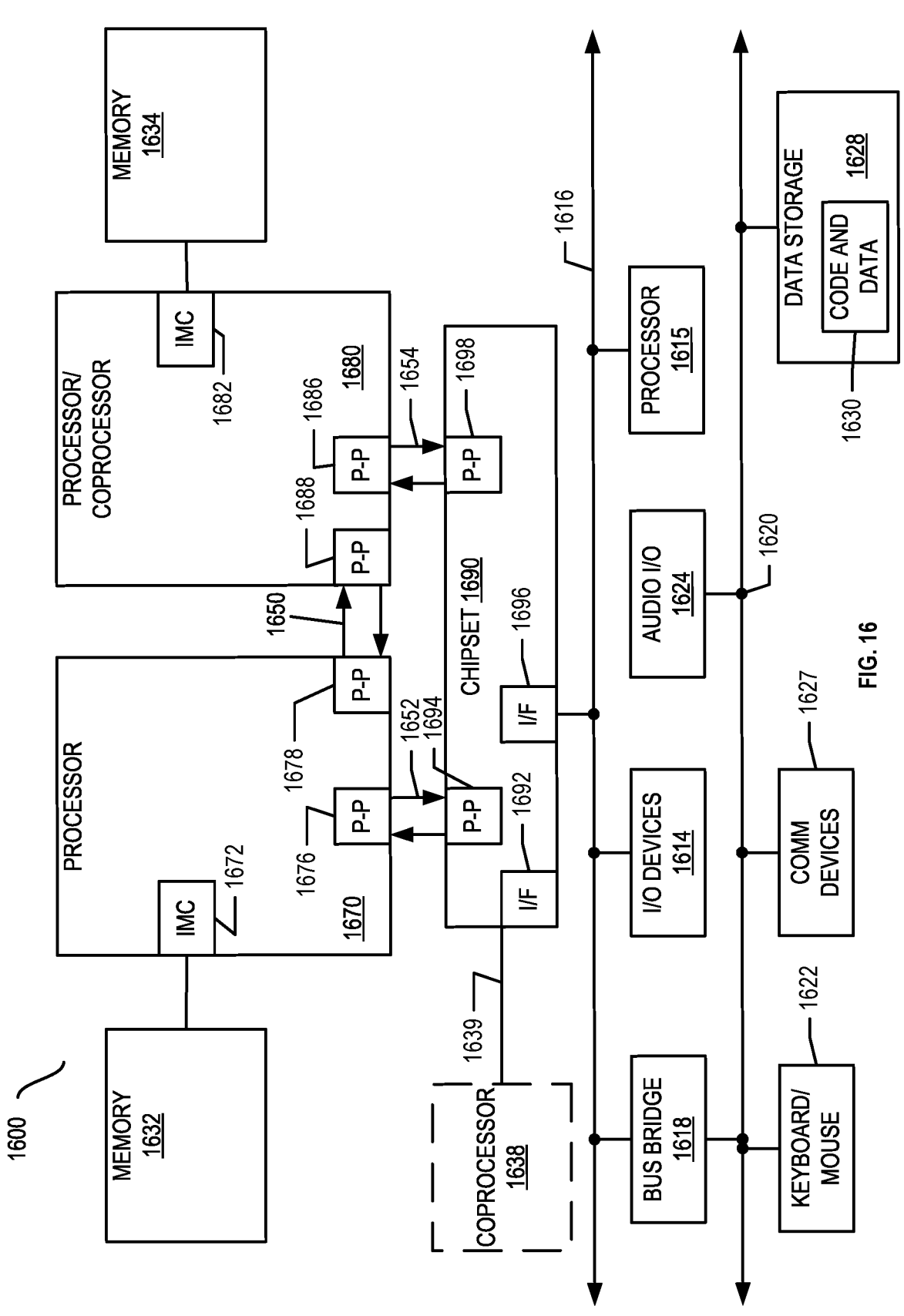
FIG. 16 illustrates a block diagram of a second system in accordance with an embodiment of the present invention.

Referring now to FIG. 16, shown is a block diagram of a first more specific exemplary system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment of the invention, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) hardware 1672 and 1682, respectively. Processor 1670 also includes as part of its bus controller hardware point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1639. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) hardware), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage hardware 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
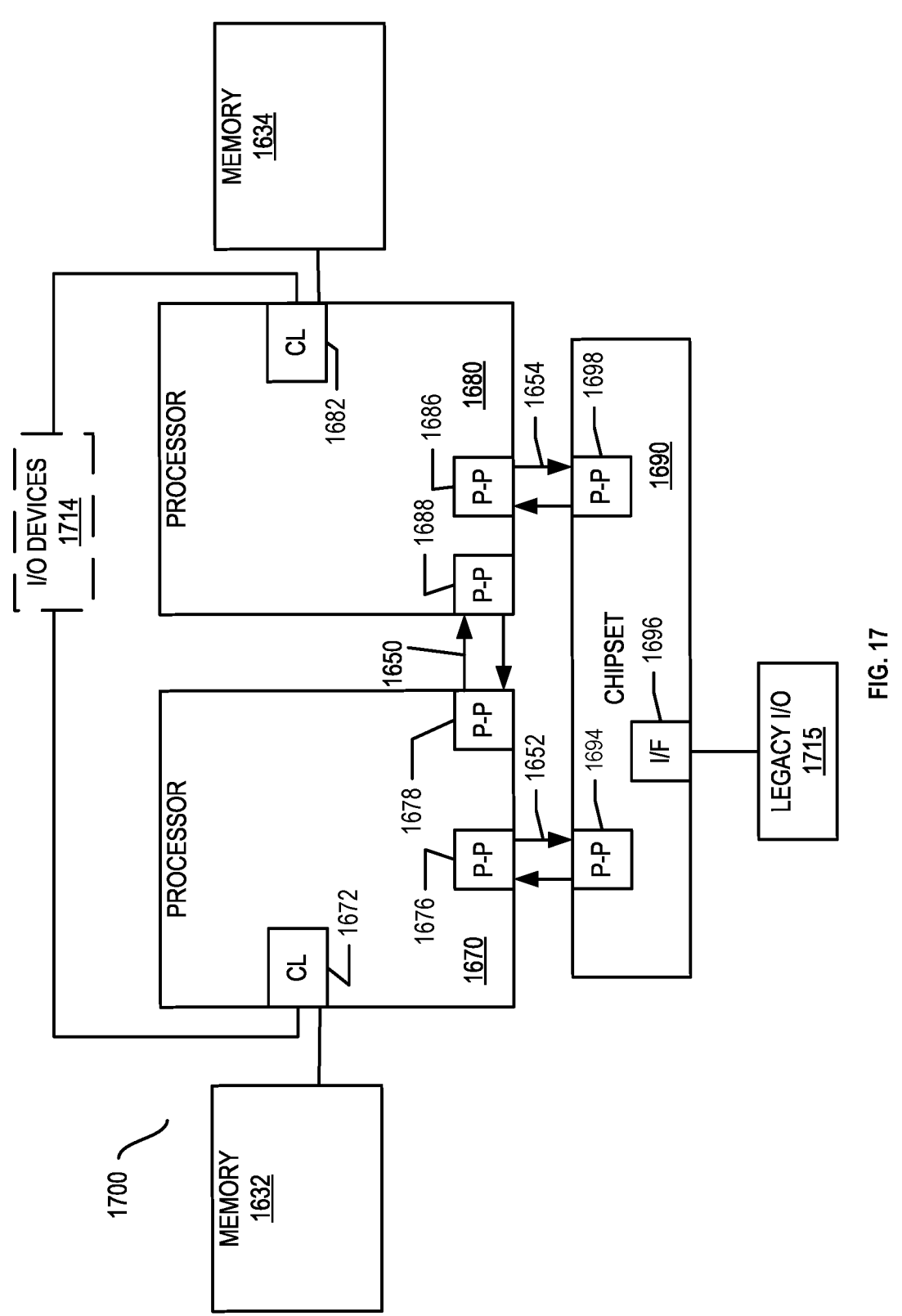
FIG. 17 illustrates a block diagram of a third system in accordance with an embodiment of the present invention.

Referring now to FIG. 17, shown is a block diagram of a second more specific exemplary system 1700 in accordance with an embodiment of the present invention. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller hardware and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
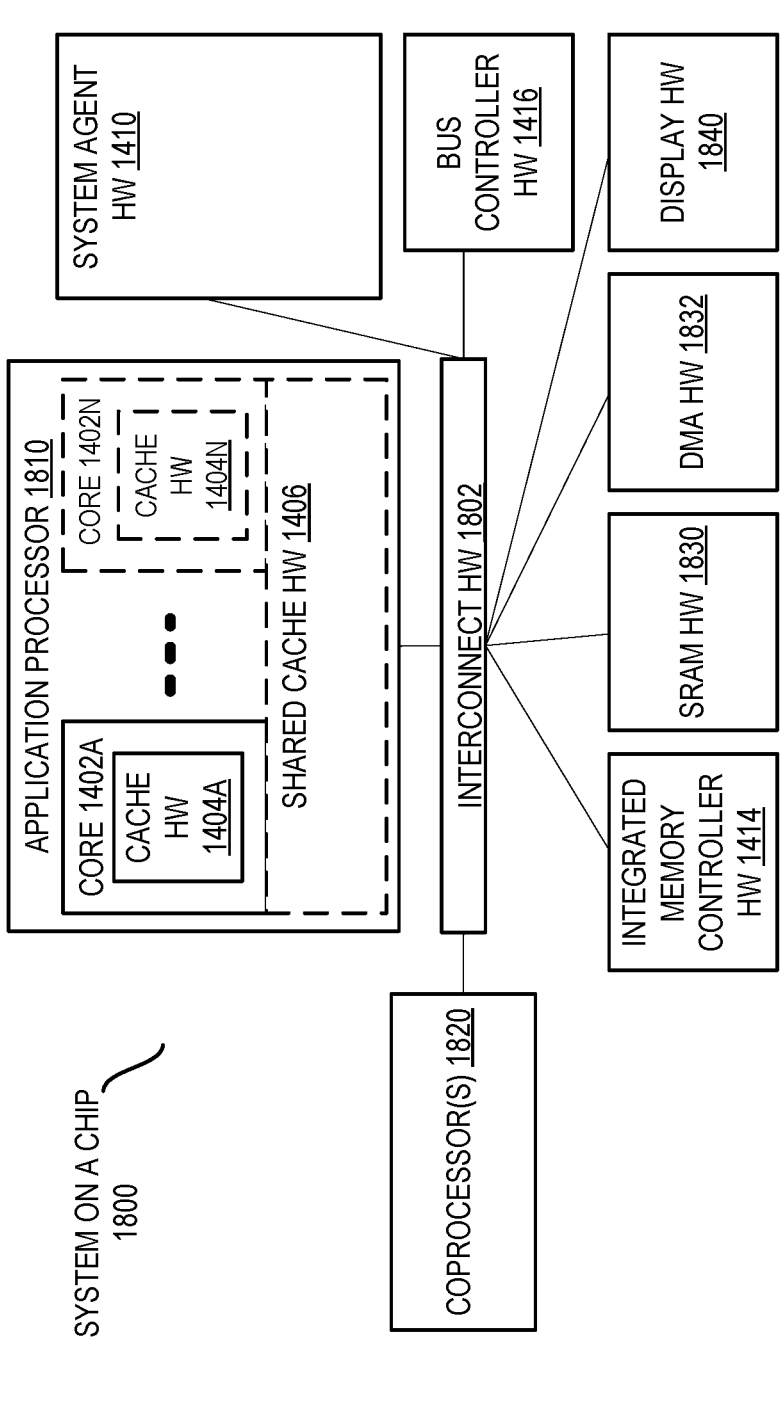
FIG. 18 illustrates a block diagram of a system on a chip (SoC) in accordance with an embodiment of the present invention.

Referring now to FIG. 18, shown is a block diagram of a SoC 1800 in accordance with an embodiment of the present invention. Similar elements in FIG. 14 bear like reference numerals. Also, dashed lined boxes are optional features on more advanced SoCs. In FIG. 18, an interconnect hardware 1802 is coupled to: an application processor 1810 which includes a set of one or more cores 1402A-N and shared cache hardware 1406; a system agent hardware 1410; a bus controller hardware 1416; an integrated memory controller hardware 1414; a set or one or more coprocessors 1820 which may include integrated graphics logic, an image processor, an audio processor, and a video processor; an static random access memory (SRAM) hardware 1830; a direct memory access (DMA) hardware 1832; and a display hardware 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
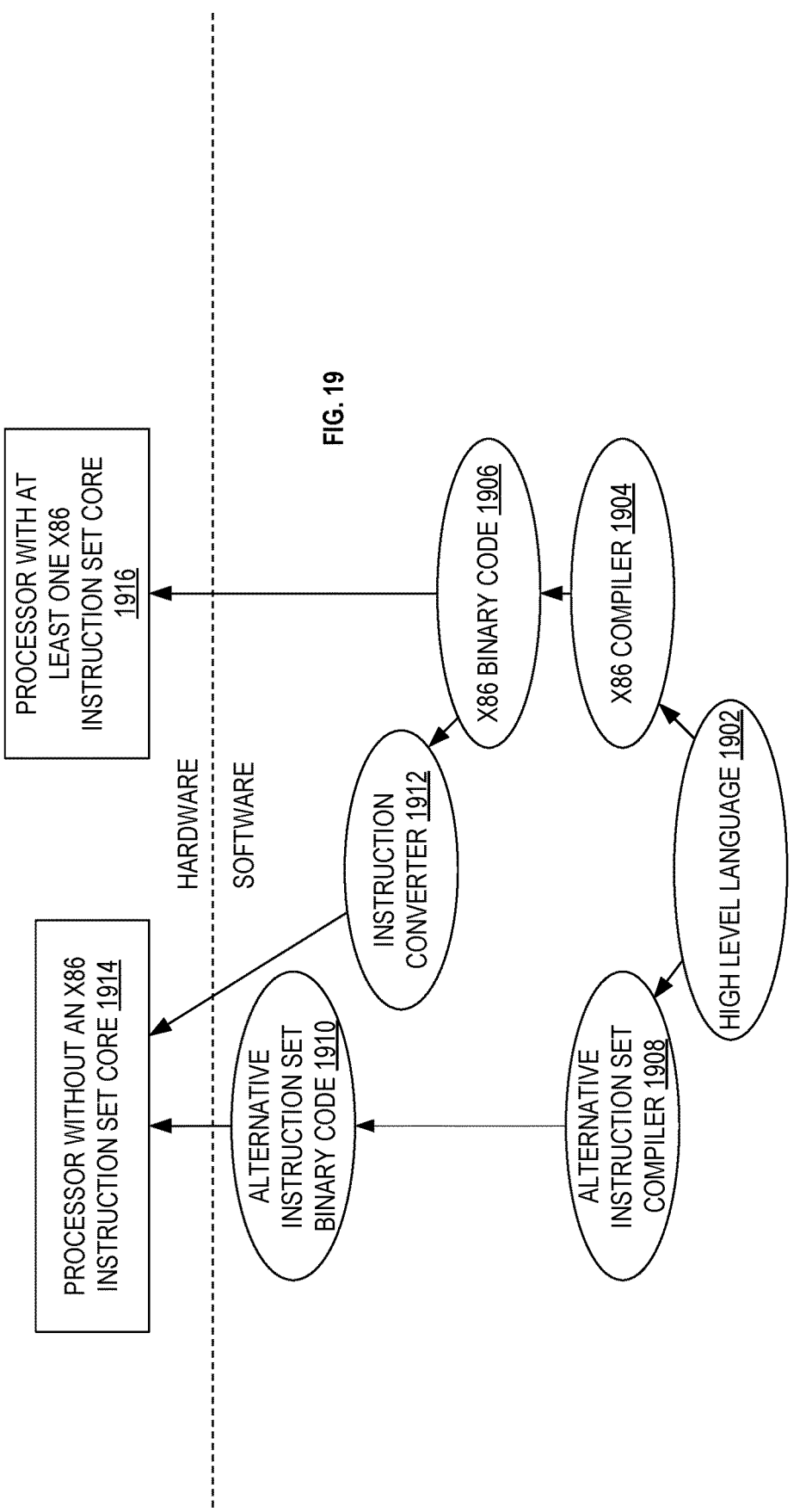
FIG. 19 illustrates a block diagram contrasting the use of a software instruction converter to convert binary instructions in a source instruction set to binary instructions in a target instruction set according to embodiments of the invention.

FIG. 19 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, CA and/or that execute the ARM instruction set of ARM Holdings of Sunnyvale, CA). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

FURTHER EXAMPLES

The following are example implementations of different embodiments of the invention.

Example 1 provides an exemplary integrated circuit (IC) device that includes a memory array containing a plurality of memory cells to store data and compression/decompression circuitry to perform compression operations on data to be written to the memory array and decompression operations on data read from the memory array, wherein the memory array and the compression/decompression circuitry are integrated in a same die but at different die depth, and wherein at least a portion of the memory array overlaps a portion of the compression/decompression circuitry in a same x-y plane.

Example 2 includes the substance of Example 1, wherein the portion of the compression/decompression circuitry is located directly underneath the portion of the memory array in the die.

Example 3 includes the substance of Examples 1 to 2, wherein the IC device further includes memory peripheral circuitry to perform operations including write and read data to and from the memory array.

Example 4 includes the substance of Example 3, wherein the memory peripheral circuitry includes controller circuitry to direct a read request from a compute circuitry, or a cache associated therewith, to the memory array when requested data is stored in the memory array.

Example 5 includes the substance of Example 4, wherein the controller circuitry is to direct the read request to a main memory when the requested data is not stored in the memory array.

Example 6 includes the substance of Example 5, wherein a copy of the requested data is read from the main memory, compressed by the compression/decompression circuitry, and stored to the memory array.

Example 7 includes the substance of Example 6, wherein the copy of the requested data read from the main memory is used to fill the read request.

Example 8 includes the substance of Examples 4 to 7, wherein the compute circuitry is integrated on a second die that is coupled to, but separate from, the die in which the memory array and the compression/decompression circuitry are integrated.

Example 9 includes the substance of Examples 3 to 8, wherein the compression/decompression circuitry is implemented in a front end of the line (FEOL) of the die.

Example 10 includes the substance of Example 9, wherein memory array is implemented in a plurality of metal layers of a back end of the line (BEOL) of the die.

Example 11 includes the substance of Example 10, wherein the memory peripheral circuitry occupies the FEOL and at least a portion of the BEOL.

Example 12 includes the substance of Examples 1 to 11, wherein the memory array stores both compressed data and uncompressed data.

Example 13 includes the substance of Examples 1 to 12, wherein the die comprises an embedded dynamic random access memory (eDRAM).

Example 14 provides an exemplary method of forming an integrated circuit (IC) device. The method includes forming, in a front end of the line (FEOL) process on a substrate of a die, compression/decompression circuitry for performing data compression and/or decompression operations, and forming, in a back end of the line (BEOL) process on the substrate, a memory array for storing data, including data compressed by the compression/decompression circuitry. The method further includes integrating the memory array and the compression/decompression circuitry in the same die but at different depths, wherein at least a portion of the memory array overlaps a portion of the compression/decompression circuitry in a same x-y plane.

Example 15 includes the substance of Example 14, wherein the portion of the compression/decompression circuitry is located directly underneath the portion of the memory array in the die.

Example 16 includes the substance of Example 15, wherein the method further includes integrating memory peripheral circuitry on the die in the FEOL and/or the BEOL process, the memory peripheral circuitry to perform operations including writing and reading data to and from the memory array.

Example 17 includes the substance of Example 16, wherein controller circuitry of the memory peripheral circuitry is to direct a read request from a compute circuitry on a second die, or from a cache associated therewith, to the memory array when requested data is stored in the memory array.

Example 18 includes the substance of Example 17, wherein the controller circuitry is to direct the read request to a main memory when the requested data is not stored in the memory array.

Example 19 includes the substance of Example 18, wherein a copy of the requested data is read from the main memory, compressed by the compression/decompression circuitry, and stored to the memory array.

Example 20 includes the substance of Example 19, wherein the copy of the requested data read from the main memory is used to fill the read request.

Example 21 includes the substance of Examples 17 to 20, wherein the compute circuitry is integrated on a second die that is coupled to, but separate from, the die in which the memory array and the compression/decompression circuitry are integrated.

Example 22 includes the substance of Examples 16 to 21, wherein the compression/decompression circuitry is implemented in the FEOL of the die.

Example 23 includes the substance of Example 22, wherein the memory array is implemented in a plurality of metal layers of the BEOL of the die.

Example 24 includes the substance of Example 23, wherein the memory peripheral circuitry is implemented in the FEOL and at least a portion of the BEOL.

Example 25 includes the substance of Examples 14 to 24, wherein the memory array stores both compressed data and uncompressed data.

Example 26 includes the substance of Examples 14 to 25, wherein the die comprises an embedded dynamic random access memory (eDRAM).

Example 27 provides an exemplary integrated circuit (IC) device that includes a memory array containing a plurality of memory cells to store data and compute circuitry (e.g., homomorphic compute circuitry) to perform computations on encrypted data stored in the memory array, wherein the memory array and the compute circuitry are integrated in a same die but at different die depth, and wherein at least a first portion of the memory array and a portion of the compute circuitry are overlapped in a same x-y plane.

Example 28 includes the substance of Example 27, wherein computations include one or more of ADD, OR, Invert, AND, Convolute, and Multiply operations.

Example 29 includes the substance of Examples 27 to 28, wherein the one or more computations are performed by the compute circuitry without decrypting the encrypted data.

Example 30 includes the substance of Examples 27 to 29, wherein the IC device further includes decryption circuitry to decrypt encrypted data stored in the memory array.

Example 31 includes the substance of Example 30, wherein the decryption circuitry is integrated in the same die as the memory array but at different die depth, and wherein at least a second portion of the memory array and a portion of the decryption circuitry are overlapped in a same x-y plane.

Example 32 includes the substance of Example 31, wherein the IC device further includes encryption circuitry to encrypt data to be stored in the memory array.

Example 33 includes the substance of Example 32, wherein the encryption circuitry is integrated in the same die as the memory array but at different die depth, and wherein at least a third portion of the memory array and a portion of the encryption circuitry are overlapped in a same x-y plane.

Example 34 includes the substance of Examples 27 to 33, wherein the memory array includes a first set of memory cells to store a first set of encrypted data and a second set of memory cells to store a second set of encrypted data, wherein the first and the second set of encrypted data correspond to a first and a second operand, respectively, of a computation to be performed by the compute circuitry.

Example 35 includes the substance of Example 34, wherein the first set of memory cells is to store indices of a first matrix and the second set of memory cells is to store indices of a second matrix, and the compute circuitry is to perform matrix multiplication between the first matrix and the second matrix based on the indices stored in the first and second set of memory cells.

Example 36 includes the substance of Example 35, wherein the compute circuitry is located directly underneath the first and the second set of memory cells and are connected therewith.

Example 37 includes the substance of Examples 27 to 36, wherein the encrypted data stored in the memory array is encrypted by encryption circuitry that is integrated in a second die different from the die in which the memory array and the compute circuitry are integrated.

Example 38 includes the substance of Examples 27 to 37, wherein the encrypted data stored in the memory array is decrypted by decryption circuitry that is integrated in a second die different from the die in which the memory array and the compute circuitry are integrated.

Example 39 provides an exemplary method of forming an integrated circuit (IC) device, the method includes forming, in a front end of the line (FEOL) process on a substrate of a die, compute circuitry (e.g., homomorphic compute circuitry) for performing computations on encrypted data stored in a memory array, and forming, in a back end of the line (BEOL) process on the substrate, the memory array for storing encrypted data. The method further includes integrating the memory array and the compute circuitry in the same die but at different depths, wherein at least a portion of the memory array overlaps a portion of the compute circuitry in a same x-y plane.

Example 40 includes the substance of Example 39, wherein the computations comprise one or more of ADD, OR, Invert, AND, Convolute, and Multiply operations.

Example 41 includes the substance of Examples 39 to 40, wherein the computations are performed by the compute circuitry without decrypting the encrypted data.

Example 42 includes the substance of Examples 39 to 41, wherein the method further includes forming, in the FEOL process on the substrate, decryption circuitry for decrypting the encrypted data stored in the memory array.

Example 43 includes the substance of Example 42, wherein the decryption circuitry is integrated in the same die as the memory array but at different die depth, and wherein at least a second portion of the memory array and a portion of the decryption circuitry are overlapped in a same x-y plane.

Example 44 includes the substance of Example 43, wherein the method further includes forming, in the FEOL process on the substrate, encryption circuitry for encrypting data to be stored in the memory array.

Example 45 includes the substance of Example 44, wherein the encryption circuitry is integrated in the same die as the memory array but at different die depth, and wherein at least a third portion of the memory array and a portion of the encryption circuitry are overlapped in a same x-y plane.

Example 46 includes the substance of Examples 39 to 45, wherein the memory array comprises a first set of memory cells to store a first set of encrypted data and a second set of memory cells to store a second set of encrypted data, wherein the first and the second set of encrypted data correspond to a first and a second operand, respectively, of a computation to be performed by the compute circuitry.

Example 47 includes the substance of Example 46, wherein the first set of memory cells is to store indices of a first matrix and the second set of memory cells is to store indices of a second matrix, and the compute circuitry is to perform matrix multiplication between the first matrix and the second matrix based on the indices stored in the first and second set of memory cells.

Example 48 includes the substance of Example 47, wherein the compute circuitry is located directly underneath the first and the second set of memory cells and are connected therewith.

Example 49 includes the substance of Examples 39 to 48, wherein the encrypted data stored in the memory array is encrypted by encryption circuitry that is integrated in a second die different from the die in which the memory array and the compute circuitry are integrated.

Example 50 includes the substance of Examples 39 to 49, wherein the encrypted data stored in the memory array is decrypted by decryption circuitry that is integrated in a second die different from the die in which the memory array and the compute circuitry are integrated.

Example 51 provides an exemplary system that includes compute circuitry to execute instructions, a main memory, and an integrated circuit (IC) device coupled to the compute circuitry and the main memory. The IC device includes a memory array comprising a plurality of memory cells to store data and compression/decompression circuitry to perform compression operations on data to be written to the memory array and decompression operations on data read from the memory array. The memory array and the compression/decompression circuitry are integrated in a same die but at different die depth. At least a portion of the memory array overlaps a portion of the compression/decompression circuitry in a same x-y plane.

Example 52 includes the substance of Example 51, wherein the portion of the compression/decompression circuitry is located directly underneath the portion of the memory array in the die.

Example 53 includes the substance of Example 51 to 52, wherein the IC device further includes memory peripheral circuitry to perform operations including write and read data to and from the memory array.

Example 54 includes the substance of Example 53, wherein the memory peripheral circuitry includes controller circuitry to direct a read request from a compute circuitry, or a cache associated therewith, to the memory array when requested data is stored in the memory array.

Example 55 includes the substance of Example 54, wherein the controller circuitry is to direct the read request to the main memory when the requested data is not stored in the memory array.

Example 56 includes the substance of Example 55, wherein a copy of the requested data is read from the main memory, compressed by the compression/decompression circuitry, and stored to the memory array.

Example 57 includes the substance of Example 56, wherein the copy of the requested data read from the main memory is used to fill the read request.

Example 58 includes the substance of Examples 54 to 57, wherein the compute circuitry is integrated on a second die that is coupled to, but separate from, the die in which the memory array and the compression/decompression circuitry are integrated.

Example 59 includes the substance of Example 53 to 58, wherein the compression/decompression circuitry is implemented in a front end of the line (FEOL) of the die.

Example 60 includes the substance of Example 59, wherein memory array is implemented in a plurality of metal layers of a back end of the line (BEOL) of the die.

Example 61 includes the substance of Example 60, wherein the memory peripheral circuitry occupies the FEOL and at least a portion of the BEOL.

Example 62 includes the substance of Examples 51 to 61, wherein the memory array stores both compressed data and uncompressed data.

Example 63 includes the substance of Examples 51 to 62, wherein the die comprises an embedded dynamic random access memory (eDRAM).

Example 64 provides an exemplary system that includes an execution engine to execute instructions, a main memory; and an integrated circuit (IC) device coupled to the execution engine and the main memory. The IC device includes a memory array containing a plurality of memory cells to store data and compute circuitry (e.g., homomorphic compute circuitry) to perform computations on encrypted data stored in the memory array. The memory array and the compute circuitry are integrated in a same die but at different die depth. At least a first portion of the memory array and a portion of the compute circuitry are overlapped in a same x-y plane.

Example 65 includes the substance of Example 64, wherein computations include one or more of ADD, OR, Invert, AND, Convolute, and Multiply operations.

Example 66 includes the substance of Examples 64 to 65, wherein the one or more computations are performed by the compute circuitry without decrypting the encrypted data.

Example 67 includes the substance of Examples 64 to 66, wherein the IC device further includes decryption circuitry to decrypt encrypted data stored in the memory array.

Example 68 includes the substance of Example 67, wherein the decryption circuitry is integrated in the same die as the memory array but at different die depth, and wherein at least a second portion of the memory array and a portion of the decryption circuitry are overlapped in a same x-y plane.

Example 69 includes the substance of Example 68, wherein the IC device further includes encryption circuitry to encrypt data to be stored in the memory array.

Example 70 includes the substance of Example 69, wherein the encryption circuitry is integrated in the same die as the memory array but at different die depth, and wherein at least a third portion of the memory array and a portion of the encryption circuitry are overlapped in a same x-y plane.

Example 71 includes the substance of Examples 64 to 70, wherein the memory array includes a first set of memory cells to store a first set of encrypted data and a second set of memory cells to store a second set of encrypted data, wherein the first and the second set of encrypted data correspond to a first and a second operand, respectively, of a computation to be performed by the compute circuitry.

Example 72 includes the substance of Example 71, wherein the first set of memory cells is to store indices of a first matrix and the second set of memory cells is to store indices of a second matrix, and the compute circuitry is to perform matrix multiplication between the first matrix and the second matrix based on the indices stored in the first and second set of memory cells.

Example 73 includes the substance of Example 72, wherein the compute circuitry is located directly underneath the first and the second set of memory cells and are connected therewith.

Example 74 includes the substance of Examples 64 to 73, wherein the encrypted data stored in the memory array is encrypted by encryption circuitry that is integrated in a second die different from the die in which the memory array and the compute circuitry are integrated.

Example 75 includes the substance of Examples 64 to 74, wherein the encrypted data stored in the memory array is decrypted by decryption circuitry that is integrated in a second die different from the die in which the memory array and the compute circuitry are integrated.

Example 76 includes the substance of Examples 64 to 75, wherein the execution engine is integrated in a second die different from the die in which the memory array and the compute circuitry are integrated.

Additional Explanation

In the foregoing specification, the embodiments of invention have been described with reference to specific exem-plary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer-readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical, or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well-known structures and functions were not described in elaborate detail in order to avoid obscuring the subject matter of the present invention. Accordingly, the scope and spirit of the invention should be judged in terms of the claims which follow.

What is claimed is:
1. An integrated circuit (IC) device comprising:
a memory array comprising a plurality of memory cells to store data, wherein the memory array is implemented in a back end of line (BEOL) of an embedded dynamic random-access memory (eDRAM); and compute circuitry to perform computations on encrypted data stored in the memory array, wherein the compute circuitry is implemented in a front end of line (FEOL) of the eDRAM, wherein the computations are performed by the compute circuitry without decrypting the encrypted data, and wherein the memory array and the compute circuitry are integrated in a first die but at different die depth, and wherein at least a first portion of the memory array and a portion of the compute circuitry are overlapped in a same x-y plane.

2. The IC device of claim 1, wherein the computations comprise one or more of ADD, OR, Invert, AND, Convolute, and Multiply operations.

3. The IC device of claim 1, further comprising decryption circuitry to decrypt the encrypted data stored in the memory array.

4. The IC device of claim 3, wherein the decryption circuitry is integrated in the first die as the memory array but at different die depth, and wherein at least a second portion of the memory array and a portion of the decryption circuitry are overlapped in a same x-y plane.

5. The IC device of claim 4, further comprising encryption circuitry to encrypt data to be stored in the memory array.

6. The IC device of claim 5, wherein the encryption circuitry is integrated in the first die as the memory array but at different die depth, and wherein at least a third portion of the memory array and a portion of the encryption circuitry are overlapped in a same x-y plane.

7. The IC device of claim 1, wherein the memory array comprises a first set of memory cells to store a first set of encrypted data and a second set of memory cells to store a second set of encrypted data, wherein the first and the second set of encrypted data correspond to a first and a second operand, respectively, of a computation to be performed by the compute circuitry.

8. The IC device of claim 7, wherein the first set of memory cells is to store indices of a first matrix and the second set of memory cells is to store indices of a second matrix, and the compute circuitry is to perform matrix multiplication between the first matrix and the second matrix based on the indices stored in the first and second set of memory cells.

9. The IC device of claim 8, wherein the compute circuitry is located directly underneath the first and the second set of memory cells and are connected therewith.

10. The IC device of claim 1, wherein the encrypted data stored in the memory array is encrypted by encryption circuitry that is integrated in a second die different from the first die.

11. The IC device of claim 1, wherein the encrypted data stored in the memory array is decrypted by decryption circuitry that is integrated in a second die different from the first die.

12. A system comprising:

an execution engine to execute instructions stored in a main memory or an integrated circuit (IC) device;

the main memory; and the integrated circuit (IC) device coupled to the execution engine and the main memory, the IC device comprising:

a memory array comprising a plurality of memory cells to store data, wherein the memory array is implemented in a back end of line (BEOL) of an embedded dynamic random-access memory (eDRAM);

memory peripheral circuit implemented in a front end of line (FEOL) of the eDRAM to control the memory array; and compute circuitry to perform computations on encrypted data stored in the memory array, wherein the computations are performed by the compute circuitry without decrypting the encrypted data, wherein the memory array, the memory peripheral circuit, and the compute circuitry are integrated in a first die but at different die depth, and wherein at least a first portion of the memory array and a portion of the compute circuitry are overlapped in a same x-y plane.

13. The system of claim 12, wherein the computations comprise one or more of ADD, OR, Invert, AND, Convolute, and Multiply operations.

14. The system of claim 12, wherein the IC device further comprises decryption circuitry to decrypt the encrypted data stored in the memory array.

15. The system of claim 14, wherein the decryption circuitry is integrated in the first die as the memory array but at different die depth, and wherein at least a second portion of the memory array and a portion of the decryption circuitry are overlapped in a same x-y plane.

16. The system of claim 15, wherein the IC device further comprises encryption circuitry to encrypt data to be stored in the memory array.

17. The system of claim 16, wherein the encryption circuitry is integrated in the first die as the memory array but at different die depth, and wherein at least a third portion of the memory array and a portion of the encryption circuitry are overlapped in a same x-y plane.

18. The system of claim 12, wherein the memory array comprises a first set of memory cells to store a first set of encrypted data and a second set of memory cells to store a second set of encrypted data, wherein the first and the second set of encrypted data correspond to a first and a second operand, respectively, of a computation to be performed by the compute circuitry.

19. The system of claim 18, wherein the first set of memory cells is to store indices of a first matrix and the second set of memory cells is to store indices of a second matrix, and the compute circuitry is to perform matrix multiplication between the first matrix and the second matrix based on the indices stored in the first and second set of memory cells.

20. The system of claim 19, wherein the compute circuitry is located directly underneath the first and the second set of memory cells and are connected therewith.

21. The system of claim 12, wherein the encrypted data stored in the memory array is encrypted by encryption circuitry that is integrated in a second die different from the first die.

22. The system of claim 12, wherein the encrypted data stored in the memory array is decrypted by decryption circuitry that is integrated in a second die different from the first die.

23. The system of claim 12, wherein the execution engine is integrated in a second die different from the first die.

* * * * *